US011940952B2

(12) United States Patent
Amarendran et al.

(10) Patent No.: US 11,940,952 B2
(45) Date of Patent: *Mar. 26, 2024

(54) TECHNIQUES FOR SERVING ARCHIVED ELECTRONIC MAIL

(71) Applicant: Commvault Systems, Inc., Tinton Falls, NJ (US)

(72) Inventors: Arun Prasad Amarendran, Manalapan, NJ (US); Jun H. Ahn, Manalapan, NJ (US); Tirthankar Chatterjee, Manalapan, NJ (US); Manas Bhikchand Mutha, Tinton Falls, NJ (US); Ho-Chi Chen, Marlboro, NJ (US); Prosenjit Sinha, San Jose, CA (US); Yongtao Liu, Eatontown, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,451

(22) Filed: Mar. 14, 2022

(65) Prior Publication Data

US 2022/0197865 A1    Jun. 23, 2022

Related U.S. Application Data

(63) Continuation of application No. 16/425,893, filed on May 29, 2019, now abandoned, which is a
(Continued)

(51) Int. Cl.
*G06F 16/16* (2019.01)
*G06F 11/14* (2006.01)
(Continued)

(52) U.S. Cl.
CPC ........ *G06F 16/162* (2019.01); *G06F 11/1448* (2013.01); *G06F 11/1469* (2013.01);
(Continued)

(58) Field of Classification Search
CPC ............... G06F 16/162; G06F 11/1448; G06F 11/1469; G06F 11/2094; G06F 11/2097;
(Continued)

(56) References Cited

U.S. PATENT DOCUMENTS 4,686,620 A    8/1987   Ng
4,713,755 A   12/1987   Worley, Jr. et al.
(Continued)

FOREIGN PATENT DOCUMENTS

EP    0259912 A1    3/1988
EP    0405926 A2    1/1991
(Continued)

OTHER PUBLICATIONS

Anonymous, "NTFS Sparse Files (NTFSS Only)", Jun. 4, 2002, pp. 1-1, https://web.archive.org/web/20020604013016/http://ntfs.com/ntfs-sparse.htm.
(Continued)

*Primary Examiner* — Etienne P Leroux
*Assistant Examiner* — Cindy Nguyen
(74) *Attorney, Agent, or Firm* — Commvault Systems, Inc.

(57) ABSTRACT

A system for providing user access to electronic mail includes an email client and an email server. The email client receives and communicates a user interaction with an email message The email server that receives the communication, determines whether the email message stored in a live database or in a backup storage. Upon determination that the email message is stored in a backup storage, the email server
(Continued)

performs a message exchange with a backup storage system to perform the user-requested action.

20 Claims, 17 Drawing Sheets

Related U.S. Application Data continuation of application No. 14/606,524, filed on Jan. 27, 2015, now Pat. No. 10,324,897.

(60) Provisional application No. 61/932,191, filed on Jan. 27, 2014.

(51) Int. Cl.
| | | |
|---|---|---|
| *G06F 11/20* | (2006.01) | |
| *G06F 16/13* | (2019.01) | |
| *H04L 9/40* | (2022.01) | |
| *H04L 51/42* | (2022.01) | |

(52) U.S. Cl.
CPC ...... *G06F 11/2094* (2013.01); *G06F 11/2097* (2013.01); *G06F 16/13* (2019.01); *H04L 51/42* (2022.05); *H04L 63/083* (2013.01); *G06F 2201/80* (2013.01); *H04L 63/10* (2013.01)

(58) Field of Classification Search
CPC ..... G06F 16/13; G06F 2201/80; H04L 51/42; H04L 63/083; H04L 63/10
See application file for complete search history.

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,437,012 A | 7/1995 | Mahajan |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,604,862 A | 2/1997 | Midgely et al. |
| 5,606,686 A | 2/1997 | Tarui et al. |
| 5,619,644 A | 4/1997 | Crockett et al. |
| 5,628,004 A | 5/1997 | Gormley et al. |
| 5,634,052 A | 5/1997 | Morris |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,742,792 A | 4/1998 | Yanai |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,794,229 A | 8/1998 | French et al. |
| 5,806,057 A | 9/1998 | Gormley et al. |
| 5,812,398 A | 9/1998 | Nielsen |
| 5,813,008 A | 9/1998 | Benson |
| 5,813,009 A | 9/1998 | Johnson et al. |
| 5,813,017 A | 9/1998 | Morris |
| 5,822,780 A | 10/1998 | Schutzman |
| 5,862,325 A | 1/1999 | Reed et al. |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,940,833 A | 8/1999 | Benson |
| 5,950,205 A | 9/1999 | Aviani, Jr. |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,052,735 A | 4/2000 | Ulrich et al. |
| 6,073,133 A | 6/2000 | Chrabaszcz |
| 6,076,148 A | 6/2000 | Kedem et al. |
| 6,094,416 A | 7/2000 | Ying |
| 6,125,369 A | 9/2000 | Wu |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,173,291 B1 | 1/2001 | Jenevein |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,252 B1 | 10/2001 | Raz |
| 6,324,544 B1 | 11/2001 | Alam |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,356,915 B1 | 3/2002 | Chtchetkine |
| 6,363,400 B1 | 3/2002 | Chtchetkine |
| 6,389,432 B1 | 5/2002 | Pothapragada et al. |
| 6,418,478 B1 | 7/2002 | Ignatius |
| 6,421,711 B1 | 7/2002 | Blumenau et al. |
| 6,477,544 B1 | 11/2002 | Bolosky et al. |
| 6,487,561 B1 | 11/2002 | Ofek et al. |
| 6,513,051 B1 | 1/2003 | Bolosky |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,609,157 B2 | 8/2003 | Deo |
| 6,609,183 B2 | 8/2003 | Ohran |
| 6,609,187 B1 | 8/2003 | Merrell |
| 6,658,526 B2 | 12/2003 | Nguyen et al. |
| 6,675,177 B1 | 1/2004 | Webb |
| 6,704,730 B2 | 3/2004 | Moulton |
| 6,708,195 B1 | 3/2004 | Borman |
| 6,745,304 B2 | 6/2004 | Playe |
| 6,757,699 B2 | 6/2004 | Lowry |
| 6,757,794 B2 | 6/2004 | Cabrera |
| 6,795,903 B2 | 9/2004 | Schultz |
| 6,810,398 B2 | 10/2004 | Moulton |
| 6,839,819 B2 | 1/2005 | Martin |
| 6,862,674 B2 | 3/2005 | Dice |
| 6,865,655 B1 | 3/2005 | Andersen |
| 6,868,417 B2 | 3/2005 | Kazar |
| 6,889,297 B2 | 5/2005 | Krapp et al. |
| 6,901,493 B1 | 5/2005 | Maffezzoni |
| 6,912,645 B2 | 6/2005 | Dorward |
| 6,928,459 B1 | 8/2005 | Sawdon |
| 6,952,758 B2 | 10/2005 | Chron |
| 6,959,368 B1 | 10/2005 | St. Pierre |
| 6,973,553 B1 | 12/2005 | Archibald et al. |
| 6,976,039 B2 | 12/2005 | Chefalas |

(56) References Cited

U.S. PATENT DOCUMENTS

| | | | |
|---|---|---|---|
| 6,993,162 B2 | 1/2006 | Steohanv et al. |
| 7,017,113 B2 | 3/2006 | Bourbakis |
| 7,035,876 B2 | 4/2006 | Kawai et al. |
| 7,035,880 B1 | 4/2006 | Crescenti |
| 7,035,943 B2 | 4/2006 | Yamane |
| 7,085,904 B2 | 8/2006 | Mizuno |
| 7,089,383 B2 | 8/2006 | Ji |
| 7,089,395 B2 | 8/2006 | Jacobson |
| 7,092,956 B2 | 8/2006 | Ruediger |
| 7,103,740 B1 | 9/2006 | Colgrove et al. |
| 7,107,418 B2 | 9/2006 | Ohran |
| 7,111,173 B1 | 9/2006 | Scheidt |
| 7,117,246 B2 | 10/2006 | Christenson |
| 7,139,808 B2 | 11/2006 | Anderson et al. |
| 7,143,091 B2 | 11/2006 | Charnock |
| 7,143,108 B1 | 11/2006 | George |
| 7,191,290 B1 | 3/2007 | Ackaouy |
| 7,200,604 B2 | 4/2007 | Forman |
| 7,200,621 B2 | 4/2007 | Beck et al. |
| 7,246,272 B2 | 7/2007 | Cabezas |
| 7,272,606 B2 | 9/2007 | Borthakur |
| 7,287,252 B2 | 10/2007 | Bussiere |
| 7,290,102 B2 | 10/2007 | Lubbers et al. |
| 7,310,655 B2 | 12/2007 | Dussud |
| 7,320,059 B1 | 1/2008 | Armangau |
| 7,325,110 B2 | 1/2008 | Kubo |
| 7,330,997 B1 | 2/2008 | Odom |
| 7,343,459 B2 | 3/2008 | Prahlad |
| 7,370,003 B2 | 5/2008 | Pych |
| 7,376,805 B2 | 5/2008 | Stroberger et al. |
| 7,383,304 B2 | 6/2008 | Shimada et al. |
| 7,383,462 B2 | 6/2008 | Osaki |
| 7,389,345 B1 | 6/2008 | Adams |
| 7,395,282 B1 | 7/2008 | Crescenti |
| 7,403,942 B1 | 7/2008 | Bayliss |
| 7,409,522 B1 | 8/2008 | Fair et al. |
| 7,444,382 B2 | 10/2008 | Malik |
| 7,444,387 B2 | 10/2008 | Douceur |
| 7,451,166 B2 | 11/2008 | Damani et al. |
| 7,478,096 B2 | 1/2009 | Margolus et al. |
| 7,478,113 B1 | 1/2009 | De Spiegeleer |
| 7,480,782 B2 | 1/2009 | Garthwaite |
| 7,487,245 B2 | 2/2009 | Douceur |
| 7,490,207 B2 | 2/2009 | Amarendran |
| 7,493,314 B2 | 2/2009 | Huang |
| 7,493,456 B2 | 2/2009 | Brittain et al. |
| 7,496,604 B2 | 2/2009 | Sutton |
| 7,512,745 B2 | 3/2009 | Gschwind et al. |
| 7,516,208 B1 | 4/2009 | Kerrison |
| 7,519,726 B2 | 4/2009 | Pallyill |
| 7,533,331 B2 | 5/2009 | Brown et al. |
| 7,536,440 B2 | 5/2009 | Budd et al. |
| 7,568,080 B2 | 7/2009 | Prahlad |
| 7,577,687 B2 | 8/2009 | Bank et al. |
| 7,590,639 B1 | 9/2009 | Ivanova |
| 7,603,529 B1 | 10/2009 | MacHardy et al. |
| 7,613,748 B2 | 11/2009 | Brockway |
| 7,617,297 B2 | 11/2009 | Bruce |
| 7,631,120 B2 | 12/2009 | Darcy |
| 7,631,194 B2 | 12/2009 | Wahlert |
| 7,636,824 B1 | 12/2009 | Tormasov |
| 7,647,462 B2 | 1/2010 | Wolfgang |
| 7,657,550 B2 | 2/2010 | Prahlad |
| 7,661,028 B2 | 2/2010 | Erofeev |
| 7,668,884 B2 | 2/2010 | Prahlad |
| 7,672,779 B2 | 3/2010 | Fuchs |
| 7,672,981 B1 | 3/2010 | Faibish et al. |
| 7,673,089 B2 | 3/2010 | Hinchey |
| 7,676,590 B2 | 3/2010 | Silverman |
| 7,685,126 B2 | 3/2010 | Patel |
| 7,685,177 B1 | 3/2010 | Hagerstrom |
| 7,685,384 B2 | 3/2010 | Shavit |
| 7,685,459 B1 | 3/2010 | De Spiegeleer |
| 7,698,699 B2 | 4/2010 | Rogers |
| 7,716,445 B2 | 5/2010 | Bonwick |
| 7,721,292 B2 | 5/2010 | Frasier et al. |
| 7,734,581 B2 | 6/2010 | Gu et al. |
| 7,747,579 B2 | 6/2010 | Prahlad |
| 7,747,584 B1 | 6/2010 | Jernigan, IV |
| 7,747,659 B2 | 6/2010 | Bacon et al. |
| 7,778,979 B2 | 8/2010 | Hatonen et al. |
| 7,786,881 B2 | 8/2010 | Burchard et al. |
| 7,788,230 B2 | 8/2010 | Dile |
| 7,814,142 B2 | 10/2010 | Mamou |
| 7,818,287 B2 | 10/2010 | Torii |
| 7,818,495 B2 | 10/2010 | Tanaka et al. |
| 7,818,531 B2 | 10/2010 | Barrall |
| 7,830,889 B1 | 11/2010 | Lemaire |
| 7,831,707 B2 | 11/2010 | Bardsley |
| 7,831,793 B2 | 11/2010 | Chakravarty et al. |
| 7,831,795 B2 | 11/2010 | Prahlad |
| 7,836,161 B2 | 11/2010 | Scheid |
| 7,840,537 B2 | 11/2010 | Gokhale |
| 7,853,750 B2 | 12/2010 | Stager et al. |
| 7,856,414 B2 | 12/2010 | Zee |
| 7,865,470 B2 | 1/2011 | Fries |
| 7,865,678 B2 | 1/2011 | Arakawa |
| 7,870,105 B2 | 1/2011 | Arakawa |
| 7,870,486 B2 | 1/2011 | Wang |
| 7,873,599 B2 | 1/2011 | Ishii |
| 7,873,806 B2 | 1/2011 | Prahlad |
| 7,882,077 B2 | 2/2011 | Gokhale |
| 7,899,990 B2 | 3/2011 | Moll et al. |
| 7,921,077 B2 | 4/2011 | Ting et al. |
| 7,953,706 B2 | 5/2011 | Prahlad |
| 7,962,452 B2 | 6/2011 | Anglin |
| 8,028,106 B2 | 9/2011 | Bondurant et al. |
| 8,037,028 B2 | 10/2011 | Prahlad |
| 8,041,907 B1 | 10/2011 | Wu et al. |
| 8,051,367 B2 | 11/2011 | Arai et al. |
| 8,054,765 B2 | 11/2011 | Passey et al. |
| 8,055,618 B2 | 11/2011 | Anglin |
| 8,055,627 B2 | 11/2011 | Prahlad |
| 8,055,745 B2 | 11/2011 | Atluri |
| 8,078,603 B1 | 12/2011 | Chandratillake |
| 8,086,799 B2 | 12/2011 | Mondal et al. |
| 8,095,756 B1 | 1/2012 | Somavarapu |
| 8,108,429 B2 | 1/2012 | Sim-Tang |
| 8,112,357 B2 | 2/2012 | Mueller |
| 8,131,687 B2 | 3/2012 | Bates et al. |
| 8,140,786 B2 | 3/2012 | Bunte |
| 8,156,092 B2 | 4/2012 | Hewett |
| 8,156,279 B2 | 4/2012 | Tanaka et al. |
| 8,161,003 B2 | 4/2012 | Kavuri |
| 8,165,221 B2 | 4/2012 | Zheng |
| 8,166,263 B2 | 4/2012 | Prahlad |
| 8,170,994 B2 | 5/2012 | Tsaur |
| 8,190,823 B2 | 5/2012 | Waltermann et al. |
| 8,190,835 B1 | 5/2012 | Yueh |
| 8,213,540 B1 | 7/2012 | Rickey |
| 8,219,524 B2 | 7/2012 | Gokhale |
| 8,234,444 B2 | 7/2012 | Bates et al. |
| 8,239,348 B1 | 8/2012 | Bezbaruah |
| 8,244,914 B1 | 8/2012 | Nagarkar |
| 8,271,992 B2 | 9/2012 | Chatley |
| 8,285,683 B2 | 10/2012 | Gokhale |
| 8,295,875 B2 | 10/2012 | Masuda |
| 8,296,260 B2 | 10/2012 | Ting et al. |
| 8,315,984 B2 | 11/2012 | Frandzel |
| 8,346,730 B2 | 1/2013 | Srinivasan |
| 8,375,008 B1 | 2/2013 | Gomes |
| 8,380,957 B2 | 2/2013 | Prahlad |
| 8,386,436 B2 | 2/2013 | Ben-Dyke |
| 8,392,677 B2 | 3/2013 | Bunte et al. |
| 8,401,996 B2 | 3/2013 | Muller |
| 8,412,677 B2 | 4/2013 | Klose |
| 8,412,682 B2 | 4/2013 | Zheng et al. |
| 8,548,953 B2 | 10/2013 | Wong |
| 8,578,120 B2 | 11/2013 | Attarde |
| 8,620,845 B2 | 12/2013 | Stoakes et al. |
| 8,626,723 B2 | 1/2014 | Ben-Shaul |
| 8,712,969 B2 | 4/2014 | Prahlad |
| 8,712,974 B2 | 4/2014 | Datuashvili |
| 8,725,687 B2 | 5/2014 | Klose |

(56) References Cited

U.S. PATENT DOCUMENTS

| | | |
|---|---|---|
| 8,769,185 B2 | 7/2014 | Chung |
| 8,782,368 B2 | 7/2014 | Lillibridge et al. |
| 8,880,797 B2 | 11/2014 | Yueh |
| 8,909,881 B2 | 12/2014 | Bunte et al. |
| 8,935,492 B2 | 1/2015 | Gokhale |
| 8,965,852 B2 | 2/2015 | Jayaraman |
| 8,997,020 B2 | 3/2015 | Chambers |
| 9,015,181 B2 | 4/2015 | Kottomtharayil et al. |
| 9,020,890 B2 | 4/2015 | Kottomtharayil et al. |
| 9,058,117 B2 | 6/2015 | Attarde et al. |
| 9,213,540 B1 | 12/2015 | Rickey et al. |
| 9,236,079 B2 | 1/2016 | Prahlad et al. |
| 9,262,275 B2 | 2/2016 | Gokhale |
| 9,276,871 B1 | 3/2016 | Freitas |
| 9,372,479 B1 | 6/2016 | Phillips |
| 9,633,022 B2 | 4/2017 | Vijayan et al. |
| 9,639,563 B2 | 5/2017 | Gokhale |
| 9,646,166 B2 | 5/2017 | Cash |
| 9,773,025 B2 | 9/2017 | Muller et al. |
| 9,781,000 B1 | 10/2017 | Kumar |
| 10,089,337 B2 | 10/2018 | Senthilnathan et al. |
| 10,262,003 B2 | 4/2019 | Kottomtharayil et al. |
| 10,324,897 B2 | 6/2019 | Amarendran et al. |
| 10,324,914 B2 | 6/2019 | Senthilnathan et al. |
| 2001/0037323 A1 | 11/2001 | Moulton et al. |
| 2002/0055972 A1 | 5/2002 | Weinman |
| 2002/0065892 A1 | 5/2002 | Malik |
| 2002/0099806 A1 | 7/2002 | Balsamo |
| 2002/0107877 A1 | 8/2002 | Whiting |
| 2003/0004922 A1 | 1/2003 | Schmidt et al. |
| 2003/0074600 A1 | 4/2003 | Tamatsu |
| 2003/0110190 A1 | 6/2003 | Achiwa |
| 2003/0135480 A1 | 7/2003 | Van Arsdale |
| 2003/0167318 A1 | 9/2003 | Robbin |
| 2003/0172368 A1 | 9/2003 | Alumbaugh et al. |
| 2003/0177149 A1 | 9/2003 | Coombs |
| 2003/0236763 A1 | 12/2003 | Kilduff |
| 2004/0128287 A1 | 7/2004 | Keller |
| 2004/0148306 A1 | 7/2004 | Moulton |
| 2004/0177319 A1 | 9/2004 | Horn |
| 2004/0220975 A1 | 11/2004 | Carpentier |
| 2004/0230817 A1 | 11/2004 | Ma |
| 2005/0033756 A1 | 2/2005 | Kottomtharayil |
| 2005/0060643 A1 | 3/2005 | Glass et al. |
| 2005/0066190 A1 | 3/2005 | Martin |
| 2005/0076087 A1 | 4/2005 | Budd et al. |
| 2005/0097150 A1 | 5/2005 | McKeon et al. |
| 2005/0108435 A1 | 5/2005 | Nowacki et al. |
| 2005/0131961 A1 | 6/2005 | Margolus |
| 2005/0138081 A1 | 6/2005 | Alshab et al. |
| 2005/0182780 A1 | 8/2005 | Forman et al. |
| 2005/0195660 A1 | 9/2005 | Kavuri |
| 2005/0203864 A1 | 9/2005 | Schmidt |
| 2005/0203887 A1 | 9/2005 | Joshi |
| 2005/0210460 A1 | 9/2005 | Rogers |
| 2005/0234823 A1 | 10/2005 | Schimpf |
| 2005/0254072 A1 | 11/2005 | Hirai |
| 2005/0262193 A1 | 11/2005 | Mamou et al. |
| 2005/0283461 A1 | 12/2005 | Sell |
| 2005/0286466 A1 | 12/2005 | Tagg et al. |
| 2006/0005048 A1 | 1/2006 | Osaki et al. |
| 2006/0053305 A1 | 1/2006 | Wahlert et al. |
| 2006/0010227 A1 | 3/2006 | Atluri |
| 2006/0047894 A1 | 3/2006 | Okumura |
| 2006/0047978 A1 | 3/2006 | Kawakami |
| 2006/0056623 A1 | 3/2006 | Gligor |
| 2006/0089954 A1 | 4/2006 | Anschutz |
| 2006/0095470 A1 | 5/2006 | Cochran |
| 2006/0126615 A1 | 6/2006 | Angtin |
| 2006/0129576 A1 | 6/2006 | Carpentier |
| 2006/0129771 A1 | 6/2006 | Dasgupta |
| 2006/0174112 A1 | 8/2006 | Wray |
| 2006/0206547 A1 | 9/2006 | Kulkarni |
| 2006/0206621 A1 | 9/2006 | Toebes |
| 2006/0224846 A1 | 10/2006 | Amarendran |
| 2006/0230081 A1 | 10/2006 | Craswell |
| 2006/0230244 A1 | 10/2006 | Amarendran et al. |
| 2006/0259587 A1 | 11/2006 | Ackerman |
| 2007/0022145 A1 | 1/2007 | Kavuri |
| 2007/0067399 A1 | 3/2007 | Kulkarni |
| 2007/0079170 A1 | 4/2007 | Zimmer |
| 2007/0106863 A1 | 5/2007 | Bonwick |
| 2007/0118573 A1 | 5/2007 | Gadiraju et al. |
| 2007/0136200 A1 | 6/2007 | Frank |
| 2007/0156998 A1 | 7/2007 | Gorobets |
| 2007/0179995 A1 | 8/2007 | Prahlad |
| 2007/0260476 A1 | 11/2007 | Smolen |
| 2007/0271316 A1 | 11/2007 | Hollebeek |
| 2007/0288534 A1 | 12/2007 | Zak |
| 2008/0047935 A1 | 2/2008 | Hinchey |
| 2008/0082714 A1 | 4/2008 | Hinchey |
| 2008/0082736 A1 | 4/2008 | Chow et al. |
| 2008/0098083 A1 | 4/2008 | Shergill |
| 2008/0104291 A1 | 5/2008 | Hinchey |
| 2008/0126543 A1 | 5/2008 | Hamada |
| 2008/0162518 A1 | 7/2008 | Bollinger |
| 2008/0162597 A1 | 7/2008 | Tysowski |
| 2008/0229037 A1 | 9/2008 | Bunte |
| 2008/0243769 A1 | 10/2008 | Arbour |
| 2008/0243914 A1 | 10/2008 | Prahlad |
| 2008/0244172 A1 | 10/2008 | Kano |
| 2008/0244204 A1 | 10/2008 | Cremelie et al. |
| 2008/0307000 A1 | 12/2008 | Paterson |
| 2009/0012984 A1 | 1/2009 | Ravid et al. |
| 2009/0049260 A1 | 2/2009 | Upadhyayula |
| 2009/0083341 A1 | 3/2009 | Parees |
| 2009/0083344 A1 | 3/2009 | Inoue et al. |
| 2009/0106369 A1 | 4/2009 | Chen et al. |
| 2009/0112870 A1 | 4/2009 | Ozzie |
| 2009/0119678 A1 | 5/2009 | Shih |
| 2009/0150498 A1 | 6/2009 | Branda et al. |
| 2009/0179754 A1 | 7/2009 | Burchard et al. |
| 2009/0204636 A1 | 8/2009 | Li et al. |
| 2009/0204650 A1 | 8/2009 | Wong |
| 2009/0228446 A1 | 9/2009 | Anzai |
| 2009/0268903 A1 | 10/2009 | Bojinov et al. |
| 2009/0271454 A1 | 10/2009 | Anglin et al. |
| 2009/0281847 A1 | 11/2009 | Hamilton, II |
| 2009/0319534 A1 | 12/2009 | Gokhale |
| 2009/0327625 A1 | 12/2009 | Jaquette |
| 2010/0036887 A1 | 2/2010 | Anglin et al. |
| 2010/0082529 A1 | 4/2010 | Mace et al. |
| 2010/0082672 A1 | 4/2010 | Kottomtharayil |
| 2010/0088296 A1 | 4/2010 | Periyagaram |
| 2010/0138500 A1 | 6/2010 | Consul |
| 2010/0161554 A1 | 6/2010 | Datuashvili et al. |
| 2010/0281081 A1 | 11/2010 | Stager |
| 2010/0332401 A1 | 12/2010 | Prahlad |
| 2010/0332453 A1* | 12/2010 | Prahlad .................. G06F 16/27 707/E17.007 |
| 2010/0332456 A1* | 12/2010 | Prahlad ............... G06F 16/1748 713/160 |
| 2011/0125711 A1 | 5/2011 | Meisenheimer |
| 2012/0102286 A1 | 4/2012 | Holt |
| 2012/0159098 A1 | 6/2012 | Cheung |
| 2012/0233417 A1 | 9/2012 | Kalach |
| 2012/0271793 A1 | 10/2012 | Gokhale |
| 2012/0311581 A1 | 12/2012 | Balmin |
| 2013/0041872 A1 | 2/2013 | Aizman |
| 2013/0086007 A1 | 4/2013 | Bandopadhyay |
| 2013/0117305 A1 | 5/2013 | Varakin |
| 2013/0212200 A1 | 8/2013 | Dennis et al. |
| 2013/0218350 A1 | 8/2013 | Phillips |
| 2013/0218842 A1 | 8/2013 | Muller et al. |
| 2013/0262386 A1 | 10/2013 | Kottomtharayil et al. |
| 2013/0262801 A1 | 10/2013 | Sancheti |
| 2013/0290598 A1 | 10/2013 | Fiske |
| 2014/0006382 A1 | 1/2014 | Barber |
| 2014/0012814 A1 | 1/2014 | Bercovici et al. |
| 2014/0129961 A1 | 5/2014 | Zubarev |
| 2014/0181079 A1 | 6/2014 | Ghazal |
| 2014/0188532 A1 | 7/2014 | Liu |
| 2014/0250088 A1 | 9/2014 | Klose et al. |
| 2014/0310232 A1 | 10/2014 | Plattner |

(56) References Cited

U.S. PATENT DOCUMENTS

| | | |
|---|---|---|
| 2014/0337591 A1 | 11/2014 | Guo et al. |
| 2015/0178277 A1 | 6/2015 | Singhal |
| 2015/0199242 A1 | 7/2015 | Attarde et al. |
| 2015/0205678 A1 | 7/2015 | Kottomtharayil et al. |
| 2015/0205817 A1 | 7/2015 | Kottomtharayil et al. |
| 2016/0124658 A1 | 5/2016 | Prahlad |
| 2016/0179435 A1 | 6/2016 | Haley |
| 2016/0210064 A1 | 7/2016 | Dornemann |
| 2016/0342633 A1 | 11/2016 | Senthilnathan |
| 2016/0342655 A1 | 11/2016 | Mishra |
| 2016/0342661 A1 | 11/2016 | Kumarasamy |
| 2017/0083408 A1 | 3/2017 | Vijayan et al. |
| 2017/0206206 A1 | 7/2017 | Gokhale |
| 2018/0144000 A1 | 5/2018 | Muller |
| 2018/0239772 A1 | 8/2018 | Vijayan et al. |
| 2018/0364914 A1 | 12/2018 | Prahlad |
| 2019/0042609 A1 | 2/2019 | Senthilnathan |
| 2019/0188188 A1 | 6/2019 | Kottomtharayil et al. |
| 2019/0266139 A1 | 8/2019 | Kumarasamy et al. |
| 2019/0278748 A1 | 9/2019 | Amarendran et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO 95/13580 A1 | 5/1995 |
| WO | WO 99/12098 A1 | 3/1999 |
| WO | WO 03/027891 A1 | 4/2003 |
| WO | WO 2006/052872 A2 | 5/2006 |
| WO | WO 2008/070688 A1 | 6/2008 |
| WO | WO 2008/080140 A2 | 7/2008 |

OTHER PUBLICATIONS

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

CommVault Systems, Inc., "Continuous Data Replicator 7.0," Product Data Sheet, 2007, 6 pages.

CommVault Systems, Inc., "Deduplication—How to," <http://documentation.commvault.com/commvault/release_8_0_0/books_online_1/english_US/features/single_instance/single_instance_how_to.htm>, earliest known publication date: Jan. 26, 2009, 7 pages.

CommVault Systems, Inc., "Deduplication," <http://documentation.commvault.com/commvault/release_8_0_0/books_online_1/english_US/features/single_instance/single_instance.htm>, earliest known publication date: Jan. 26, 2009, 9 pages.

Diligent Technologies "HyperFactor," <http://www.diligent.com/products:protecTIER-1:HyperFactor-1>, Internet accessed on Dec. 5, 2008, 2 pages.

Eitel, "Backup and Storage Management in Distributed Heterogeneous Environments," IEEE, Jun. 12-16, 1994, pp. 124-126.

Enterprise Storage Management, "What Is Hierarchical Storage Management?", Jun. 19, 2005, pp. 1, http://web.archive.org/web/20050619000521/hhttp://www.enterprisestoragemanagement.com/faq/hierarchical-storage-management-shtml.

Enterprise Storage Management, What Is a Incremental Backup?, Oct. 26, 2005, pp. 1-2, http://web.archive.org/web/w0051026010908/http://www.enterprisestoragemanagement.com/faq/incremental-backup.shtml.

Federal Information Processing Standards Publication 180-2, "Secure Hash Standard", Aug. 1, 2002, <http://csrc.nist.gov/publications/fips/fips1 80-2/fips 1 80-2withchangenotice. pdf>, 83 pages.

FlexHex, "NTFS Sparse Files for Programmers", Feb. 22, 2006, pp. 1-4, https://web.archive.org/web/20060222050807/http://www.flexhex.com/docs/articles/sparse-files.phtml.

Gait, J., "The Optical File Cabinet: A Random-Access File System for Write-Once Optical Disks," IEEE Computer, vol. 21, No. 6, pp. 11-22 (Jun. 1988).

Geer, D., "Reducing the Storage Burden via Data Deduplication," IEEE, Computer Journal, vol. 41, Issue 12, Dec. 2008, pp. 15-17.

Handy, Jim, "The Cache Memory Book: The Authoritative Reference on Cache Design," Second Edition, 1998, pp. 64-67 and pp. 204-205.

Jander, M., "Launching Storage-Area Net," Data Communications, US, McGraw Hill, NY, vol. 27, No. 4 (Mar. 21, 1998), pp. 64-72.

Kornblum, Jesse, "Identifying Almost Identical Files Using Context Triggered Piecewise Hashing," www.sciencedirect.com, Digital Investigation 3S (2006), pp. S91-S97.

Kulkarni P. et al., "Redundancy elimination within large collections of files," Proceedings of the Usenix Annual Technical Conference, Jul. 2, 2004, pp. 59-72.

Lortu Software Development, "Kondar Technology-Deduplication," <http://www.lortu.com/en/deduplication.asp>, Internet accessed on Dec. 5, 2008, 3 pages.

Menezes et al., "Handbook of Applied Cryptography", CRC Press, 1996, <http://www.cacr.math.uwaterloo.ca/hac/aboutlchap9.pdf>, 64 pages.

Microsoft, "Computer Dictionary", p. 249, Fifth Edition, 2002, 3 pages.

Microsoft, "Computer Dictionary", pp. 142, 150, 192, and 538, Fifth Edition, 2002, 6 pages.

Microsoft, "Computer Dictionary," Fifth Edition, 2002, p. 220.

Overland Storage, "Data Deduplication," <http://www.overlandstorage.com/topics/data_deduplication.html>, Internet accessed on Dec. 5, 2008, 2 pages.

Quantum Corporation, "Data De-Duplication Background: A Technical White Paper," May 2008, 13 pages.

Rosenblum et al., "The Design and Implementation of a Log-Structured File System," Operating Systems Review SIGOPS, vol. 25, No. 5, New York, US, pp. 1-15 (May 1991).

SearchStorage, "File System", Nov. 1998, <http://searchstorage.techtarget.com/definition/file-system>, 10 pages.

Sharif, A., "Cache Memory," Sep. 2005, http://searchstorage.techtarget.com/definition/cache-memory, pp. 1-26.

Webopedia, "Cache," Apr. 11, 2001, http://web.archive.org/web/20010411033304/http://www.webopedia.com/TERM/c/cache.html pp. 1-4.

Webopedia, "Data Duplication", Aug. 31, 2006, <http://web.archive.org/web/20060913030559/http://www.webopedia.com/TERMID/data_deduplication.html>, 2 pages.

Webopedia, "File," May 21, 2008, pp. 1-3, <https://web.archive.org/web/20080521094529/https://www.webopedia.com/TERM/F/file.html>.

Webopedia, "Folder", Aug. 9, 2002, <https://web.archive.org/web/20020809211001/http://www.webopedia.com/TERM/F/folder.html> pp. 1-2.

Webopedia, "Logical Drive", Aug. 13, 2004, pp. 1-2, https://web.archive.org/web/20040813033834/http://www.webopedia.com/TERM/L/logical_drive.html.

Webopedia, "LPAR", Aug. 8, 2002, pp. 1-2, https://web.archive.org/web/20020808140639/http://www.webopedia.com/TERM/L/LPAR.html.

Webopedia, "Metadata", Apr. 5, 2001, <https://web.archive.org/web/20010405235507/http://www.webopedia.com/TERM/M/metadata.html>, pp. 1-2.

Canada Office Action for Application No. 2706007, dated Jul. 30, 2014, 2 pages.

Extended European Search Report for EP07865192.4; dated May 2, 2013, 7 pages.

International Preliminary Report on Patentability and Written Opinion for PCT/US2007/086421, dated Jun. 18, 2009, 8 pages.

(56) References Cited

OTHER PUBLICATIONS

International Preliminary Report on Patentability and Written Opinion for PCT/US2011/054378, dated Apr. 11, 2013, 5 pages.
International Search Report and Written Opinion for PCT/US07/86421, dated Apr. 18, 2008, 9 pages.
International Search Report for Application No. PCT/US09/58137, dated Dec. 23, 2009, 14 pages.
International Search Report for Application No. PCT/US10/34676, dated Nov. 29, 2010, 9 pages.
International Search Report for Application No. PCT/US11/54378, dated May 2, 2012, 8 pages.
Partial Supplementary European Search Report in Application No. 09816825.5, dated Apr. 15, 2015, 6 pages.

* cited by examiner

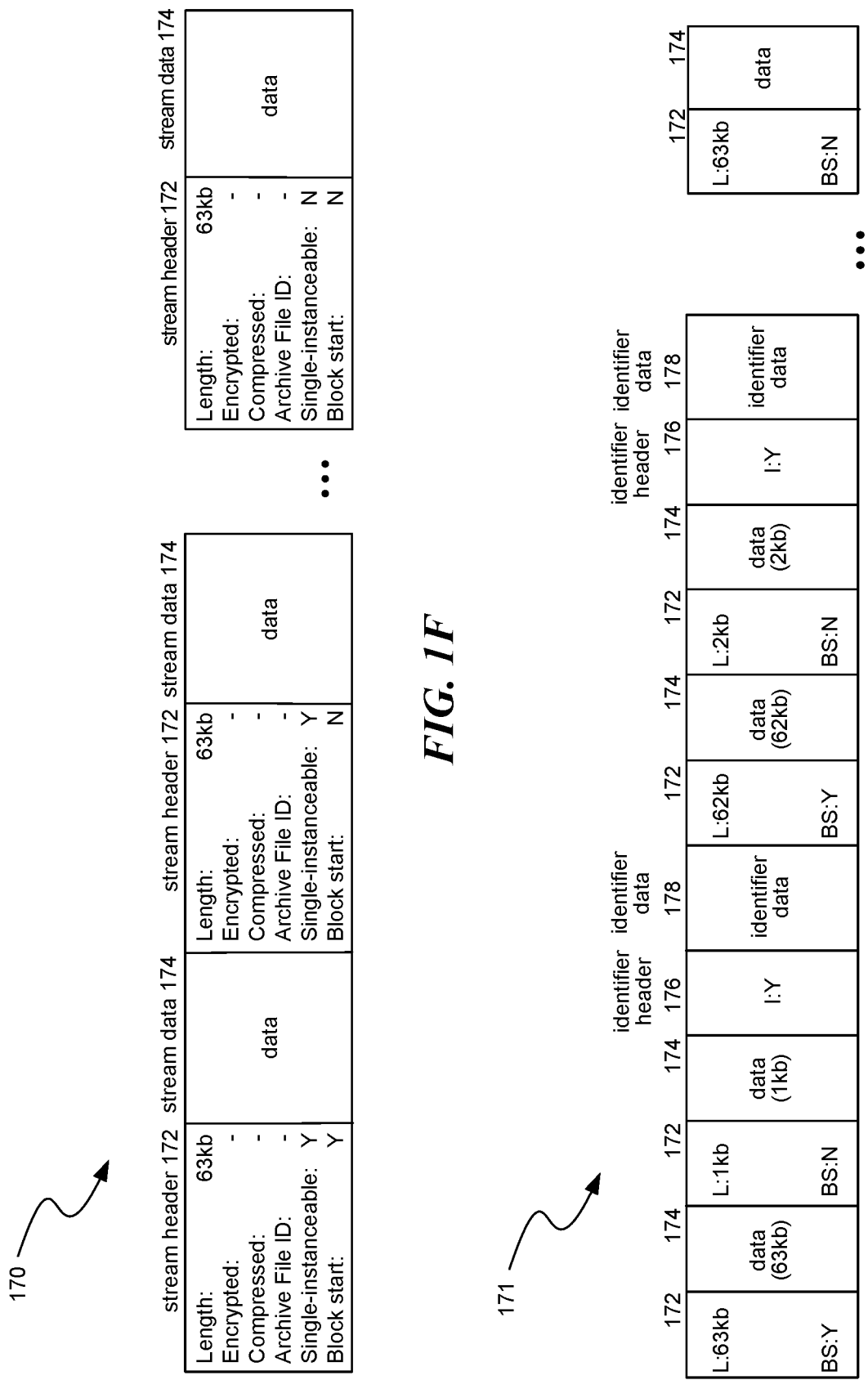

TECHNIQUES FOR SERVING ARCHIVED ELECTRONIC MAIL

CROSS-REFERENCE TO RELATED APPLICATION(S)

The present application is a Continuation of Ser. No. 16/425,893 filed on May 29, 2019, which is Continuation of U.S. patent application Ser. No. 14/606,524 filed on Jan. 27, 2015 (now U.S. Pat. No. 10,324,897), which claims priority to and the benefit of U.S. Provisional Application No. 61/932,191, filed Jan. 27, 2014, all of which are hereby incorporated herein by reference in their entireties.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are in increasing demand.

BRIEF DESCRIPTION OF THE DRAWINGS

FIGS. 1F-1H are block diagrams illustrating suitable data structures that may be employed by the information management system.

DETAILED DESCRIPTION

Figure 1A:
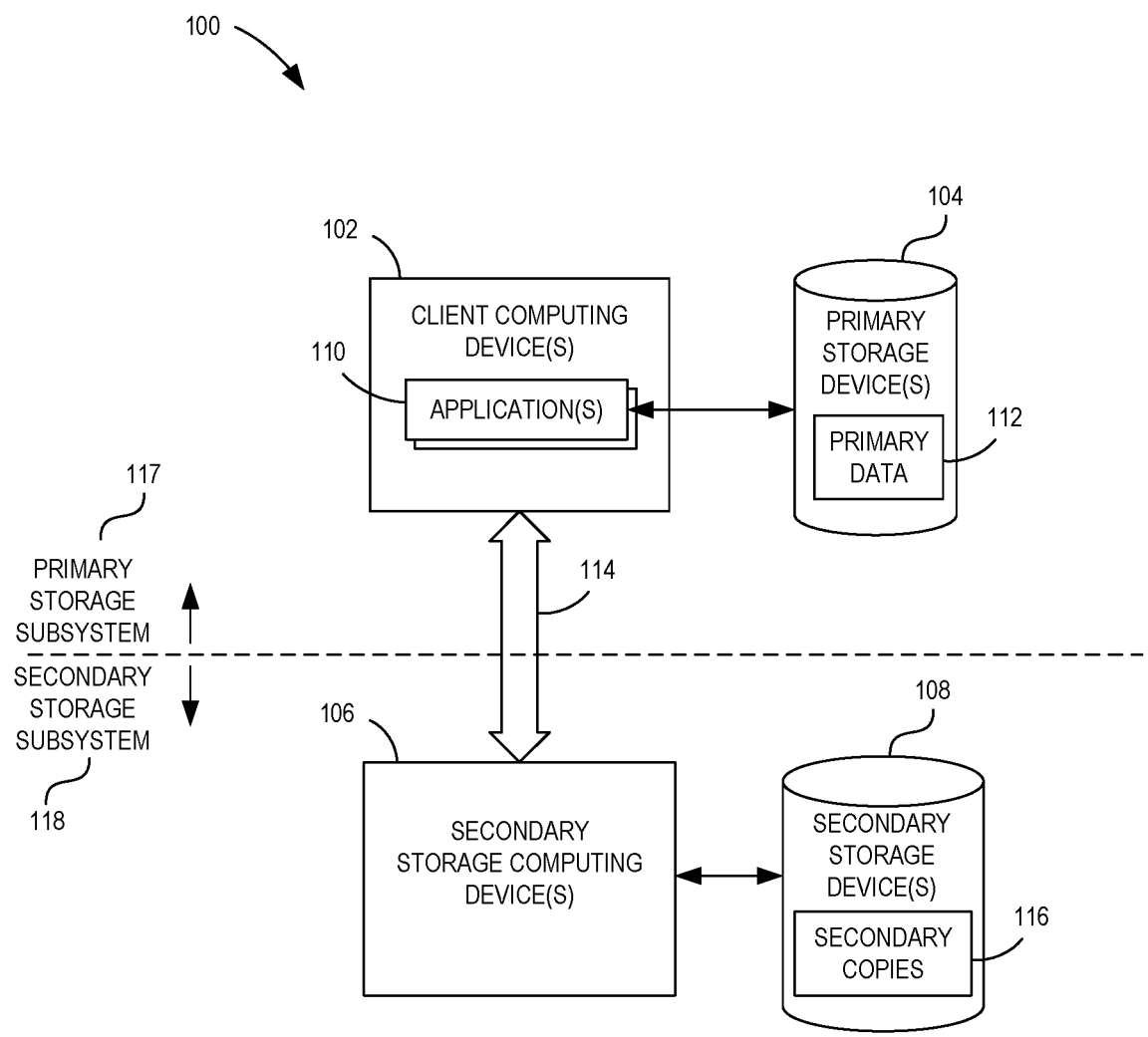
FIG. 1A is a block diagram illustrating an exemplary information management system.

Electronic mail (email) is a versatile tool used by users for communicating business and personal messages. Individual email items can include attachments, such as images and documents, and may be stored by users in their email inbox for easy access. An email server typically manages user access to emails by storing a user's emails in a mailbox associated with the user. Many online email service providers maintain large server farms and storage systems to enable web-based user access to emails.

In corporate settings, however, information technology (IT) departments often find it advantageous to keep the size of mailboxes or the number of items stored in user mailboxes within a manageable limit. Thus, for operational efficiency, corporations often archive old emails and store them in backup formats such as magnetic tapes or optical discs. In present day email systems, accessing backed up emails is cumbersome and time consuming. A user may have to first be made aware that an email item that the user is looking for has been archived. The user may also have to be trained on how to restore an email item from an archive folder.

The techniques provided in the present document can be used to provide a seamless access to archived email. In some embodiments, users may be able to use an off-the-shelf email client application to connect to an email server and perform actions such as view, reply, delete, move, etc. with email items without having to explicitly know or remember whether the email item is archived or not. In some embodiments, an email server may be configured to implement operational rules that customize actions that a user can perform on archived email. For example, in various embodiments, a user may be able perform some of the following actions: adding an email item from inbox to an archive, restoring an email item from the archive to a regular inbox, reply to an archived item, copy an archived item into another folder, move an archived item into another folder, and so on.

Using the techniques disclosed in the present document, an email service provider will be able to offer an email service in which users are able to connect to an email server using the same email client that they are currently using. The service provider could set up the email server by specifying rules about how archived emails are created, restored and made available to users. These rules can control and modify the operation of the email server without having to make any changes to the email client applications and the protocol format used for communication between an email client application and the email client server. These, and other, features are described in the present document.

Various examples of the invention will now be described, staring with an overview of a suitable environment, followed by aspects of the invention. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "SYSTEMS AND METHODS FOR MANAGEMENT OF VIRTUALIZATION DATA";

U.S. Pat. No. 7,035,880, entitled "Modular Backup and Retrieval System Used in Conjunction With a Storage Area Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,246,207, entitled "System and Method for Dynamically Performing Storage Operations in a Computer Network";

U.S. Pat. No. 7,747,579, entitled "Metabase for Facilitating Data Classification";

U.S. Pat. No. 8,229,954, entitled "Managing Copies of Data";

U.S. Pat. No. 7,617,262, entitled "System and Methods for Monitoring Application Data in a Data Replication System";

U.S. Pat. No. 7,529,782, entitled "System and Methods for Performing a Snapshot and for Restoring Data";

U.S. Pat. No. 8,230,195, entitled "SYSTEM AND METHOD FOR PERFORMING AUXILIARY STORAGE OPERATIONS";

U.S. Pat. No. 7,315,923, entitled "SYSTEM AND METHOD FOR COMBINING DATA STREAMS IN PIPELINED STORAGE OPERATIONS IN A STORAGE NETWORK";

U.S. Pat. No. 8,364,652, entitled "Content-Aligned, Block-Based Deduplication";

U.S. Pat. Pub. No. 2006/0224846, entitled "System and Method to Support Single Instance Storage Operations";

U.S. Pat. Pub. No. 2010/0299490, entitled "BLOCK-LEVEL SINGLE INSTANCING";

U.S. Pat. Pub. No. 2009/0319534, entitled "Application-Aware and Remote Single Instance Data Management";

U.S. Pat. Pub. No. 2012/0150826, entitled "Distributed Deduplicated Storage System";

U.S. Pat. Pub. No. 2012/0150818, entitled "Client-Side Repository in a Networked Deduplicated Storage System";

U.S. Pat. No. 8,170,995, entitled "Method and System for Offline Indexing of Content and Classifying Stored Data";

U.S. Pat. No. 7,107,298, entitled "SYSTEM AND METHOD FOR ARCHIVING OBJECTS IN AN INFORMATION STORE";

U.S. Pat. No. 8,230,195, entitled "SYSTEM AND METHOD FOR PERFORMING AUXILIARY STORAGE OPERATIONS";

U.S. Pat. No. 8,229,954, entitled "MANAGING COPIES OF DATA"; and

U.S. Pat. No. 8,156,086, entitled "SYSTEMS AND METHODS FOR STORED DATA VERIFICATION".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers.

Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host computer. One example of hypervisor as virtualization software is ESX Server, by VMware, Inc. of Palo Alto, California; other examples include Microsoft Virtual Server and Microsoft Windows Server Hyper-V, both by Microsoft Corporation of Redmond, Washington, and Sun xVM by Oracle America Inc. of Santa Clara, California In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host computer, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system residing on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g. GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
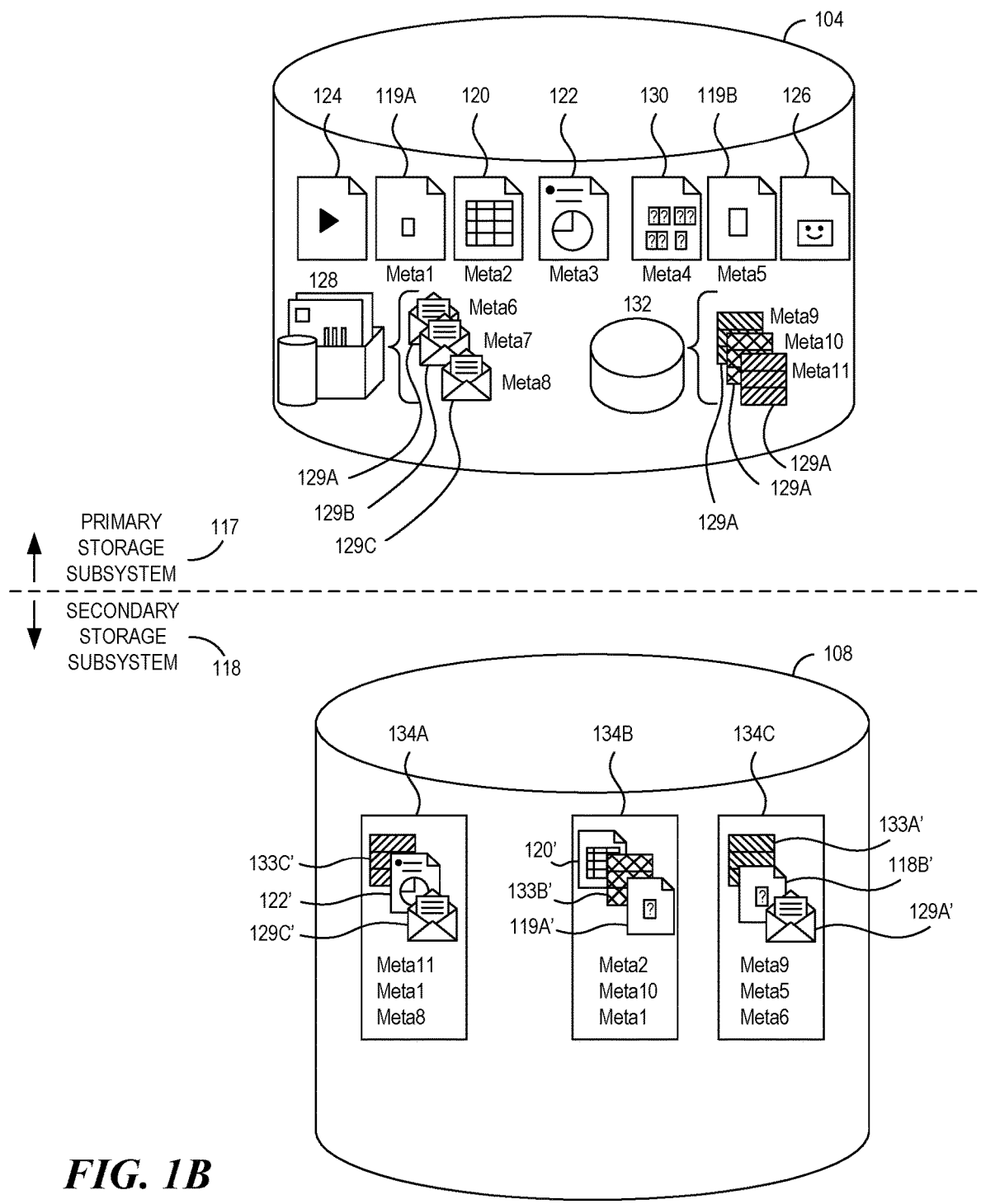
FIG. 1B is a detailed view of a primary storage device, a secondary storage device, and some examples of primary data and secondary copy data.

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122 and 129C (represented as 133C', 122' and 129C', respectively, and accompanied by the corresponding metadata Meta11, Meta3, and Meta8, respectively). Moreover, as indicated by the prime mark ('), a secondary copy object may store a representation of a primary data object or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
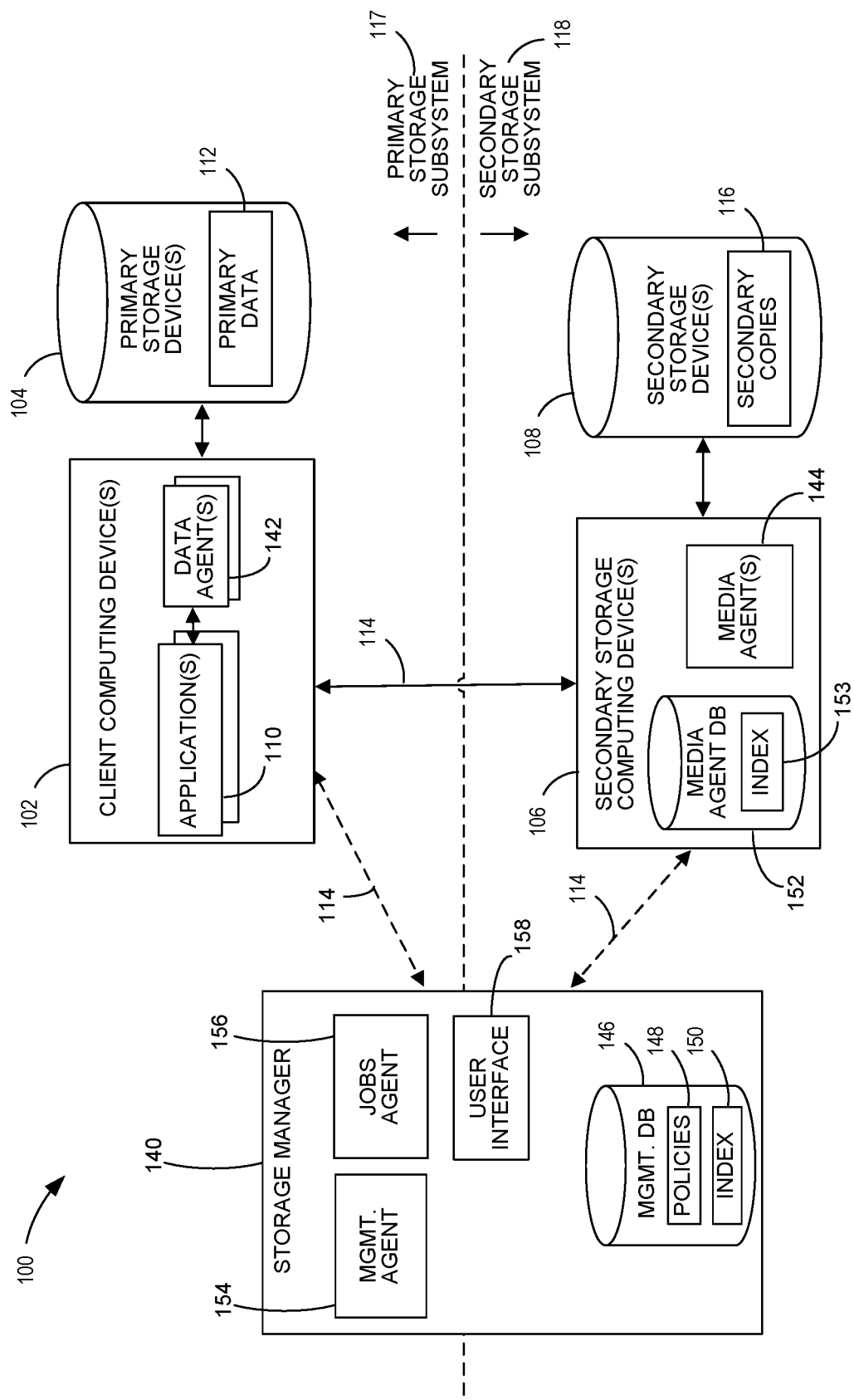
FIG. 1C is a block diagram of an exemplary information management system including a storage manager, one or more data agents, and one or more media agents.

FIG. 1C shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application. The storage manager generally initiates, performs, coordinates and/or controls storage and other information management operations performed by the information management system 100, e.g., to protect and control the primary data 112 and secondary copies 116 of data and metadata.

As shown by the dashed arrowed lines 114, the storage manager 140 may communicate with and/or control some or all elements of the information management system 100, such as the data agents 142 and media agents 144. Thus, in certain embodiments, control information originates from the storage manager 140, whereas payload data and payload metadata is generally communicated between the data agents 142 and the media agents 144 (or otherwise between the client computing device(s) 102 and the secondary storage computing device(s) 106), e.g., at the direction of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:

initiating execution of secondary copy operations;
managing secondary storage devices 108 and inventory/capacity of the same;
reporting, searching, and/or classification of data in the information management system 100;
allocating secondary storage devices 108 for secondary storage operations;
monitoring completion of and providing status reporting related to secondary storage operations;
tracking age information relating to secondary copies 116, secondary storage devices 108, and comparing the age information against retention guidelines;
tracking movement of data within the information management system 100;
tracking logical associations between components in the information management system 100;
protecting metadata associated with the information management system 100; and
implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An information management "cell" may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. Nos. 7,747,579 and 7,343,453, which are incorporated by reference herein.

Data Agents

As discussed, a variety of different types of applications 110 can reside on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

Where the information management system 100 includes multiple media agents 144 (FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the database 146 is relatively large, the database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
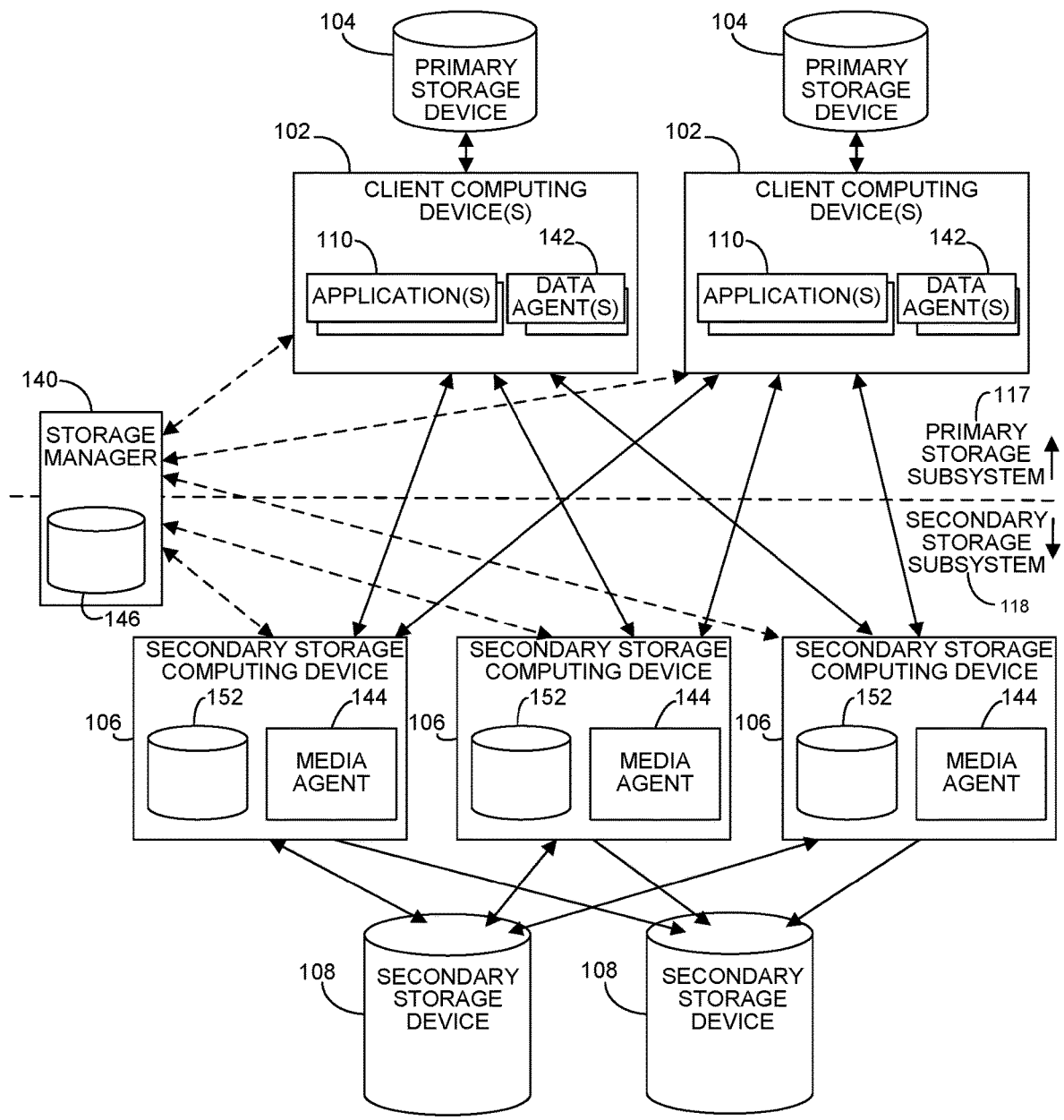
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing platform, e.g. between two computers connected via a LAN, to a mobile client telecommunications device connected to a server via a WLAN, to any manner of client device coupled to a cloud storage target.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files at the file-level, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware" snapshot operation can be a snapshot operation where a target storage device (e.g., a primary storage device 104 or a secondary storage device 108) performs the snapshot operation in a self-contained fashion, substantially independently, using hardware, firmware and/or software residing on the storage device itself. For instance, the storage device may be capable of performing snapshot operations upon request, generally without intervention or oversight from any of the other components in the information management system 100. In this manner, using hardware snapshots can off-load processing involved in snapshot creation and management from other components in the system 100.

A "software" snapshot operation, on the other hand, can be a snapshot operation in which one or more other components in the system (e.g., the client computing devices 102, data agents 142, etc.) implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or an application. In some other cases, the snapshot may be created at the block-level, such as where creation of the snapshot occurs without awareness of the file system. Each pointer points to a respective stored data block, so collectively, the set of pointers reflect the storage location and state of the data object (e.g., file(s) or volume(s) or data set(s)) at a particular point in time when the snapshot copy was created.

Once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually later modified. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., data-block signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side, source-side, or client-side of an operation can be cloud-based storage devices. Thus, the target-side, source-side, and/or client-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 (or other source storage device, such as a secondary storage device 108) to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the data stored within the primary data 112 and/or secondary copies 116, providing enhanced search and management capabilities for data discovery and other purposes. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

In order to further leverage the data stored in the information management system 100 to perform these and other tasks, one or more components can be configured to scan data and/or associated metadata for classification purposes to populate a database (or other data structure) of information (which can be referred to as a "data classification database" or a "metabase"). Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components. For instance, there may be a dedicated metabase associated with some or all of the client computing devices 102 and/or media agents 144. In some embodiments, a data classification database may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

As an example, a storage manager 140 or other component in the information management system 100 may analyze traffic patterns and suggest or automatically route data via a particular route to e.g., certain facilitate storage and minimize congestion. In some embodiments, the system can generate predictions relating to storage operations or storage operation information. Such predictions described may be based on a trending analysis that may be used to predict various network operations or use of network resources such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of a set of associated storage operation cells in a hierarchy of information management cells, such as the status of jobs, system components, system resources, and other items, by communicating with storage managers 140 (or other components) in the respective storage operation cells. Moreover, the master storage manager 140 may track the status of its associated storage operation cells and associated information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component in the system may also determine whether a storage-related criteria or other criteria is satisfied, and perform an action or trigger event (e.g., data migration) in response to the criteria being satisfied, such as where a storage threshold is met for a particular volume, or where inadequate protection exists for certain data. For instance, in some embodiments, the system uses data from one or more storage operation cells to advise users of risks or indicates actions that can be used to mitigate or otherwise minimize these risks, and in some embodiments, dynamically takes action to mitigate or minimize these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be able to be restored within a given time period, that data on a secondary volume may be mirrored or otherwise migrated to a specified number of other volumes, etc.). If a risk condition or other criteria is triggered, the system can notify the user of these conditions and may suggest (or automatically implement) an action to mitigate or otherwise address the condition or minimize risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies a particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" and comparing it to certain operational thresholds to determine if the operation is being performed within a specified data protection service level. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about network elements to generate indications of costs associated with storage of particular data in the system or the availability of particular data in the system. In general, components in the system are identified and associated information is obtained (dynamically or manually). Characteristics or metrics associated with the network elements may be identified and associated with that component element for further use generating an indication of storage cost or data availability. Exemplary information generated could include how fast a particular department is using up available storage space, how long data would take to recover over a particular network pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides. Storage devices may be assigned to a particular cost category which is indicative of the cost of storing information on that device. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console. The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy. Such reports may be specified and created at a certain point in time as a network analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:
- schedules or other timing information, e.g., specifying when and/or how often to perform information management operations;
- the type of copy 116 (e.g., type of secondary copy) and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:
- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Storage Operations

Figure 1E:
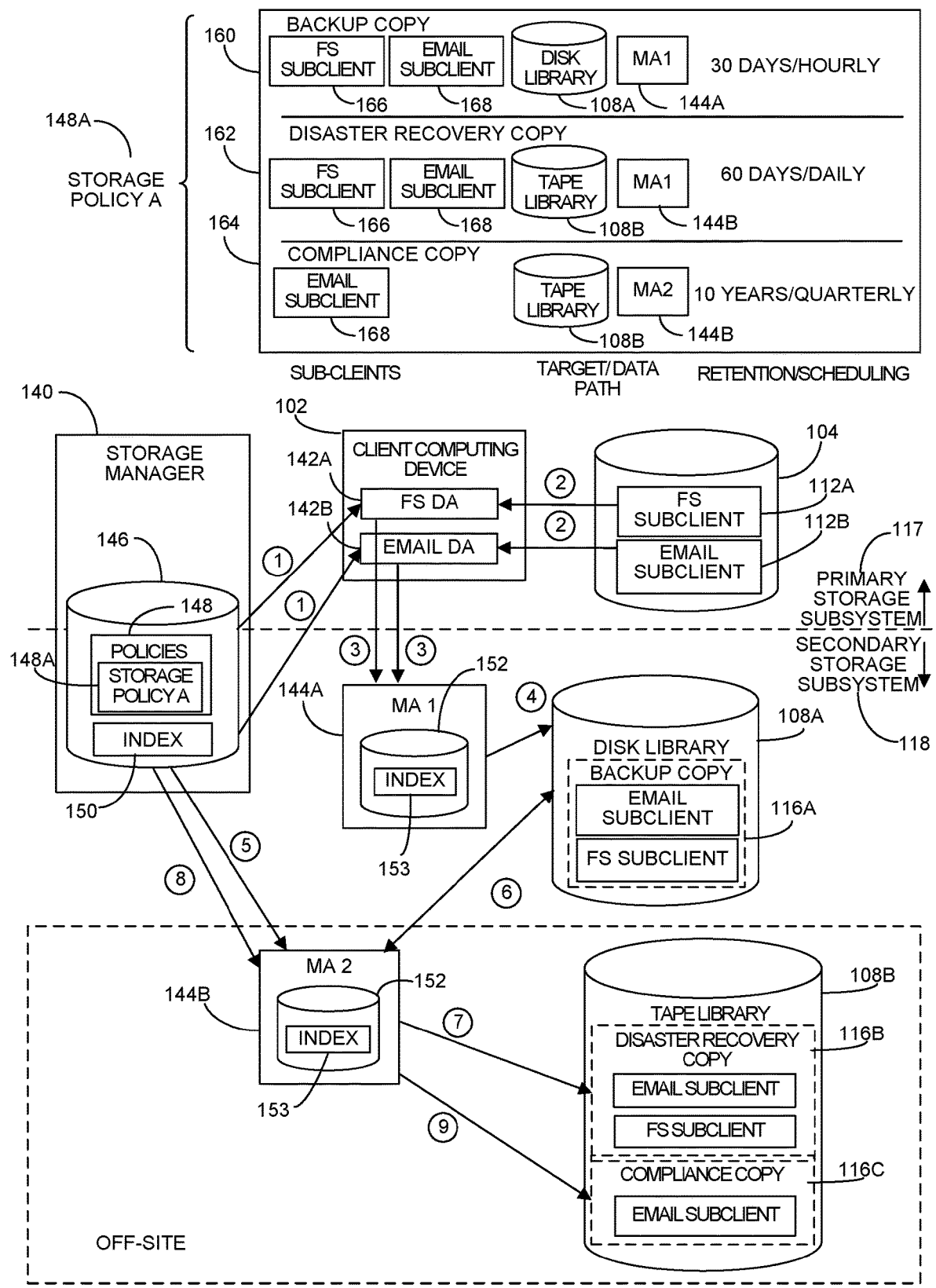
FIG. 1E illustrates certain secondary copy operations according to an exemplary storage policy.

FIG. 1E shows a data flow data diagram depicting performance of storage operations by an embodiment of an information management system 100, according to an exemplary storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a logical grouping of data associated with a file system) and a logical grouping of data associated with email data, respectively. Although for simplicity the logical grouping of data associated with the file system is referred to as a file system sub-client, and the logical grouping of data associated with the email data is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences or rule set 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization.

A classification policy defines a taxonomy of classification terms or tags relevant to a compliance task and/or business objective. A classification policy may also associate a defined tag with a classification rule. A classification rule defines a particular combination of data criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, (2) were sent to or received from outside counsel via email, and/or (3) contain one of the following keywords: "privileged" or "attorney," "counsel", or other terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g. content having a 13-16 digit string of numbers), SKU numbers, product numbers, etc.

A user may define a classification policy by indicating criteria, parameters or descriptors of the policy via a graphical user interface that provides facilities to present information and receive input data, such as a form or page with fields to be filled in, pull-down menus or entries allowing one or more of several options to be selected, buttons, sliders, hypertext links or other known user interface tools for receiving user input. For example, a user may define certain entity tags, such as a particular product number or project ID code that is relevant in the organization.

In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and U.S. Pat. Pub. No. 2010/0299490, each of which is incorporated by reference herein.

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
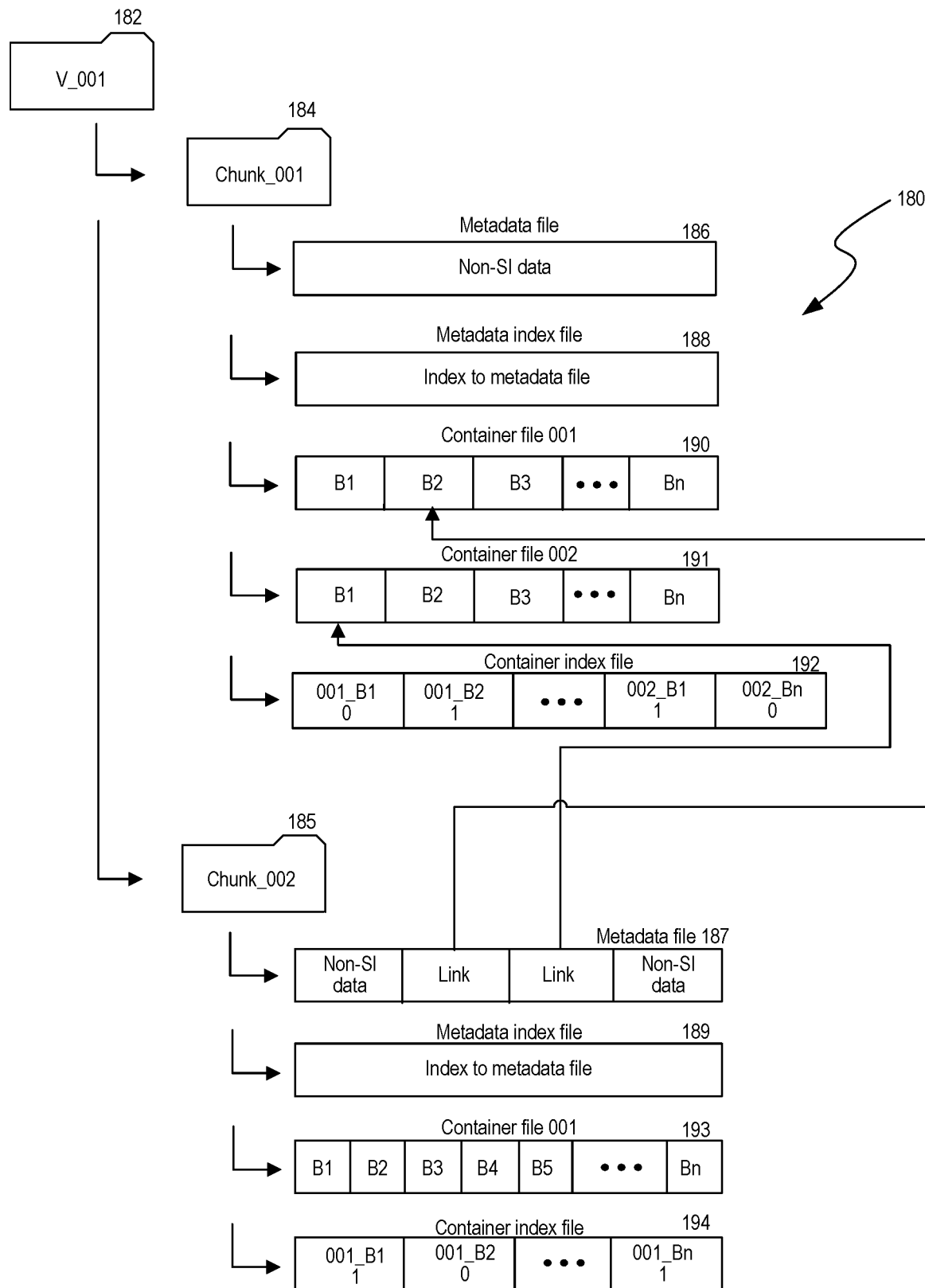

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 resides supports sparse files, then when the media agent 144 creates container files 190/191/193, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may be comprised in 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

Electronic Mail System

Electronic mail (referred to herein, interchangeably, "email" or "mail") is a versatile tool used by users for many applications, personal and business. Users use email to communicate simple text-based messages, computer files, pictures, audio and video files, etc. With the availability of Web-based free email services that allow users to store a large amount of data for free, many users typically do not delete any emails. Therefore, the size of a user's mailbox, which includes several logical folders such as inbox, sent items, junk mail, etc. typically grows over a period of time, often occupying a large amount of storage space (e.g., over 1 Gbyte).

In a corporate setting, email may be used as a primary tool for communicating information among employees. To keep information at their fingertips, or for other reasons, corporate users also do not delete their emails. Corporate users often use email servers and their mailboxes as the primary storage location for their work files. One advantage of items stored on email servers is that messages and attachments can be quickly searched, often using many different filters (e.g., time, size, people names, etc.) Mail servers often store mail items in a user's inbox in the same format that the mail came into the inbox. This format, sometimes called the "native" or "live" format, facilitate quick data access and sorting. Emails stored in the live format may be stored in a database that is local to the email server and have their locations typically mapped within the email application running on the email server.

Depending on the number of users and the amount of time for which emails are stored in users' email accounts, the amount of email data stored could pose a significant challenge to storage resources and network bandwidth of an organization. One possible solution to control mailbox size is to perform periodic "clean up" of users' email accounts by moving mail items from their primary storage to a secondary or backup storage. For example, one mail clean-up policy may archive all items not accessed for one year, while another clean-up policy may archive mail items from "deleted mail" folder that are over one month old.

However, such archiving, while helpful to a corporation to manage its email resources, may prove to be disruptive to user experience. In some present day systems, a user is made aware that some mail items are moved to an archive folder. To access archived email, the user may have to perform special steps such as logging into a second email server (e.g., archivemail.companyname.com) that is different from the user's primary email server (e.g., mail.companyname.com). Alternatively or additionally, the user may need to access or use a program that differs from the user's primary email program (e.g. use a web browser to access the archived email, rather than a primary email program like Microsoft Outlook). Due to the fragmented nature of live email items and archived email items, when a user is searching for a message or an attachment, the user may have to search twice—once in the live mailbox and another time in the archive folder. Furthermore, email applications used by users to access their mailboxes may have to be modified to allow the user to specify whether he wants to access his live mailbox or his archive mailbox. Modifications to the email application may require user training and software coding and testing, adding operational complexities that take users' and information technology (IT) personnel's time away from other important tasks.

The techniques disclosed in the present document can be used to overcome these operational limitations, and others. Using some of the disclosed techniques, in some embodiments, a user may be able to access her live and archive email using the same mail application that that the user is accustomed to, e.g., a client application based on an industry-standard protocol such as the Internet Message Access Protocol (IMAP). Transparent to the user, the email server may enforce mail backup rules and archive email items based on the mail backup rules. When an email item is moved from a live folder to an archive folder, the email item may appear in the user's mail view as belonging to another folder. The email server may make the user aware of availability of archived emails by creating a folder in the user's account that can be accessed by the user similar to other folders (e.g., inbox folder, sent items folder, etc.). These, and other, aspects are described in greater detail in the present document.

Examples of Suitable Systems

Figure 2:
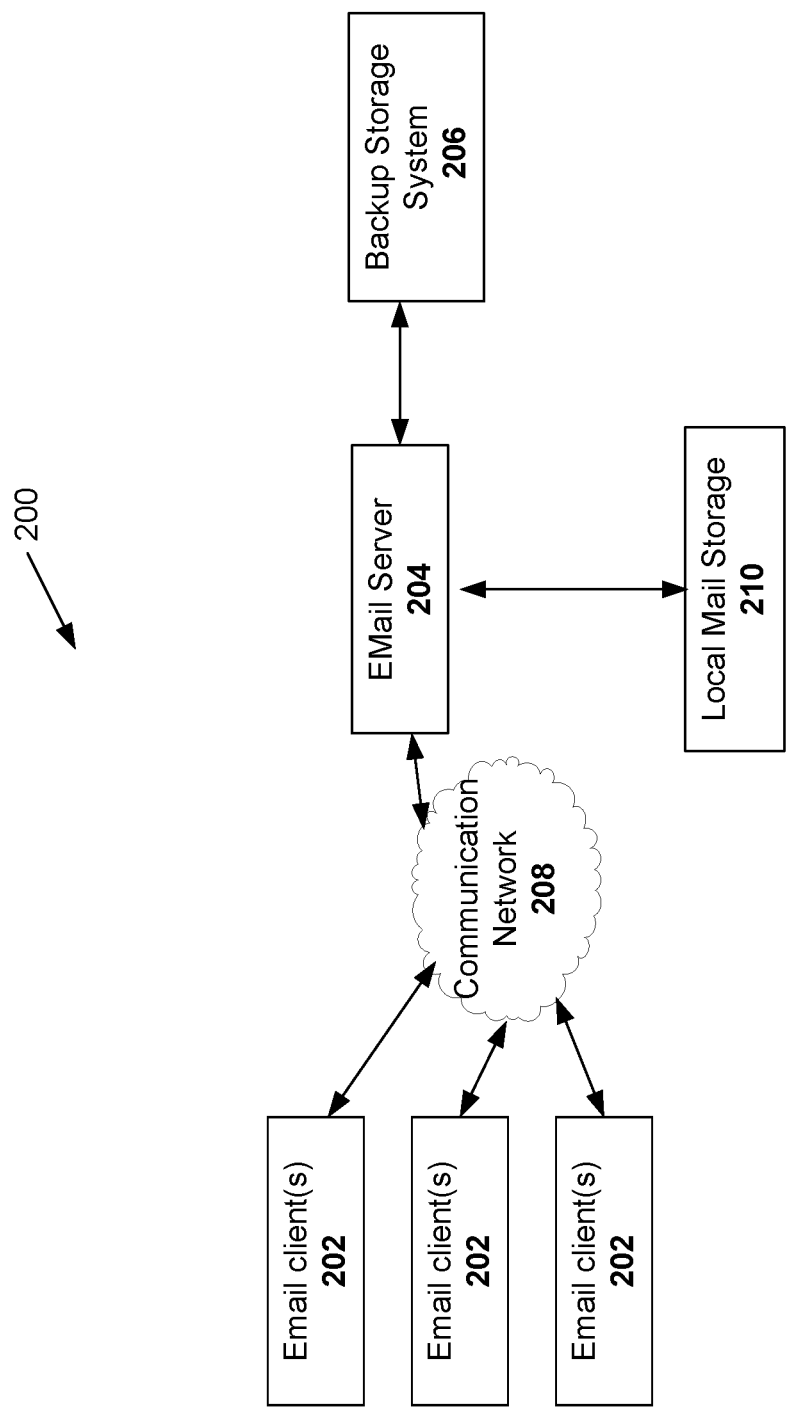
FIG. 2 is a block diagram representation of an example system for providing access to archived electronic mail.

FIG. 2 is an example of an email communication system 200. One or more email clients 202 may be communicatively coupled to the mail server 204 via a communication network 208. The mail server 204 may further be coupled to a backup storage system. The mail server 202 may also be in communication with local mail storage 210. The mail storage 210 may be, e.g., a mail database such as the mbox format. The email clients 202 may be implemented in hardware, software or a combination thereof. The email clients 202 may be embodied in user devices such as computers, laptops, tablets, mobile phones, wearable computers, vehicle-mounted systems, and so on. The communication network 208 may be the Internet or the World Wide Web and may be a combination of a wired portion and a wireless portion.

The email server 204 may be implemented on one or more computer platforms. The local mail storage 210 may be implemented using a mail storage format such as mbox. The backup storage system 206 may be, e.g., the above-described information management system (See FIG. 1A). The system 200 may be implemented in one location (e.g., a business) or may be geographically distributed, and may have a common Internet domain. The email server 204 may operate under operator control that specifies various operational parameters and policies described in the present document.

Figure 3:
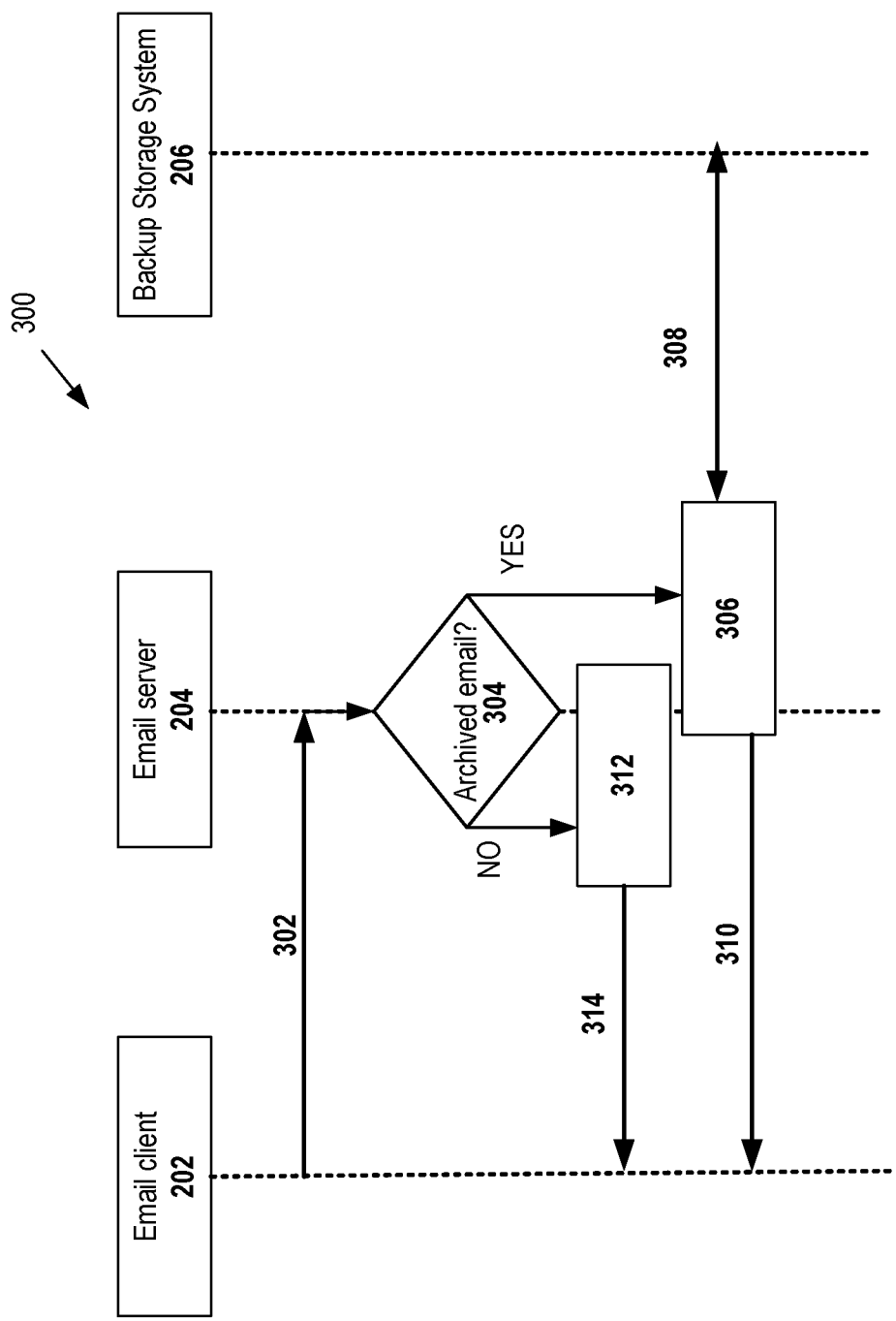
FIG. 3 depicts an example of messages exchanged for facilitating access to archived emails.

FIG. 3 provides an example 300 of messages exchanged in the system 200. An email client 202 sends a message 302 to the email server 304. The message 302 may comply with an email protocol such as IMAP. The message 302 may correspond to, and carry information about, a user action to be performed on one or more email items. For example, the message 302 may represent a user action to view (or open) an email item, to scroll an email item, to open an attachment, to copy the email message from one folder to another, to delete the email message, and so on. The message 302 may include information that uniquely identifies the email message and the action to be performed. The message 302 may also include user information identifying the requester user and/or identity of the email client 202. The user information may be explicitly included in the message 302 or may be implicitly inferred by the email server 204 based on the context of the interaction with the email client 202 and/or the IP address from which the message 302 is originated, and so on.

At 304, the email server 204 may determine whether the email item for which message 302 is requesting an action is an item in the archive email folder. At 306, upon determination that the email item is an item in the archive email folder, the email server 204 may locate, based on the identity of the email item, the backup storage system 206 and/or a media agent 212 in the backup storage system to communicate with and perform message exchanges 308 to provide the user with a response 310 to the requested action. For example, an email server 204 may have a dedicated (one-to-one) correspondence with a backup storage system, i.e., all emails archived under the control of the email server 204 may be archived and restored using the same single media agent 212. The email server 204 may maintain a backup system resolution table to find the correspondence backup storage system by mapping unique identifiers or email items to the corresponding backup storage system identity (e.g., a domain name or an IP address). The email server 204 may then provide the response 310, based on the information received at 306, to the email client 202. Upon determination (at 304) that the email item identified in the message 302 is not an archived email item, at 312, the email server 204 may perform the requested actions on the live email item and communicate the results (314) to the email client 202.

In some embodiments, the message exchange between the email client 202 and the email server 204 may comply with a well-known protocol (e.g., IMAP) and may not include, implicitly or explicitly, any indication that a message being acted upon is a live message or an archived message. To determine whether an email item identified in the message 302 is archived, the email server 204 may use one or more of a variety of techniques. For example, in some embodiments, archived email items may be identified by a unique identification space range. For example, every email item may be assigned a unique 32-bit identifier such that all email items starting with "11" as two most significant bits in their identification may be archived email items. In some embodiments, the context of how the email item was accessed (e.g., by opening the archive folder) may be used to determine that the requested email item is (or is not) an archived email item.

Figure 4:
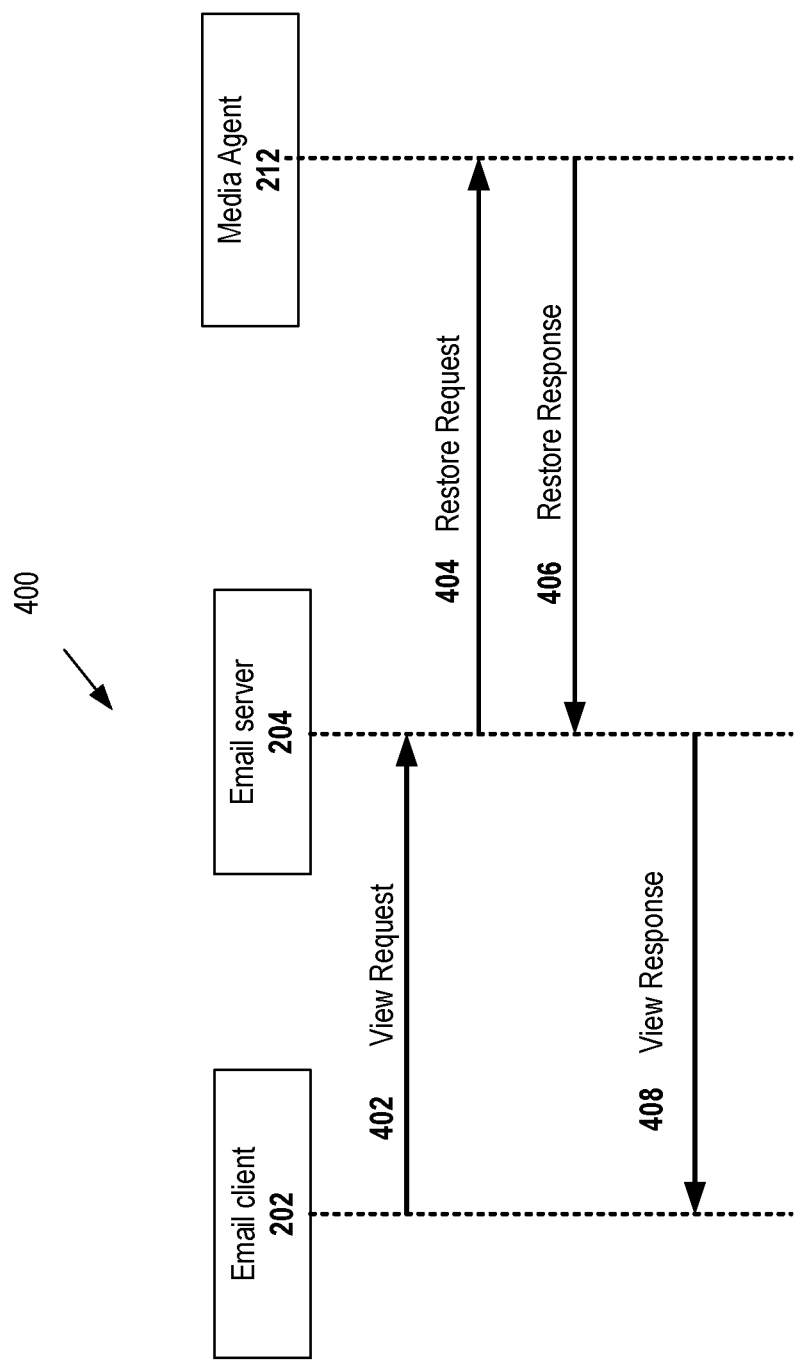
FIG. 4 depicts an example of messages exchanged for facilitating viewing of archived emails.

FIG. 4 depicts an example signal exchange diagram 400 in which the email client 202 sends a request 402 to view contents of an archived email item. In response, the email server 204 may identify an appropriate media agent 212 to contact and send a request 404 to restore the particular email item from an archive folder. To facilitate processing by the media agent 212, the email server 204 may include a protocol translation module (not shown in the drawing) that may map the identity of the email item from the view request 402 into an identifier understood by the media agent 212. In various embodiments, the identifier may be a user resource locator or a logical address that includes information about a storage media, e.g., a hard drive or a tape, an address offset within the media, etc.

Upon retrieval of the requested email item by the media agent 212, the email server 204 may receive a restore response 406 from the media agent 212. The restore response 406 may include the requested information, e.g., the contents of the email item or an attachment, or may include an error message (e.g., "requested item not found", etc.). Correspondingly, the email server 204 may provide a view response 408 to the view request 402 and provide the requested information (or an error message) to the email client 202. The view request 402 may thus be successfully met by the email server 204 without having to access any live email items.

Figure 5:
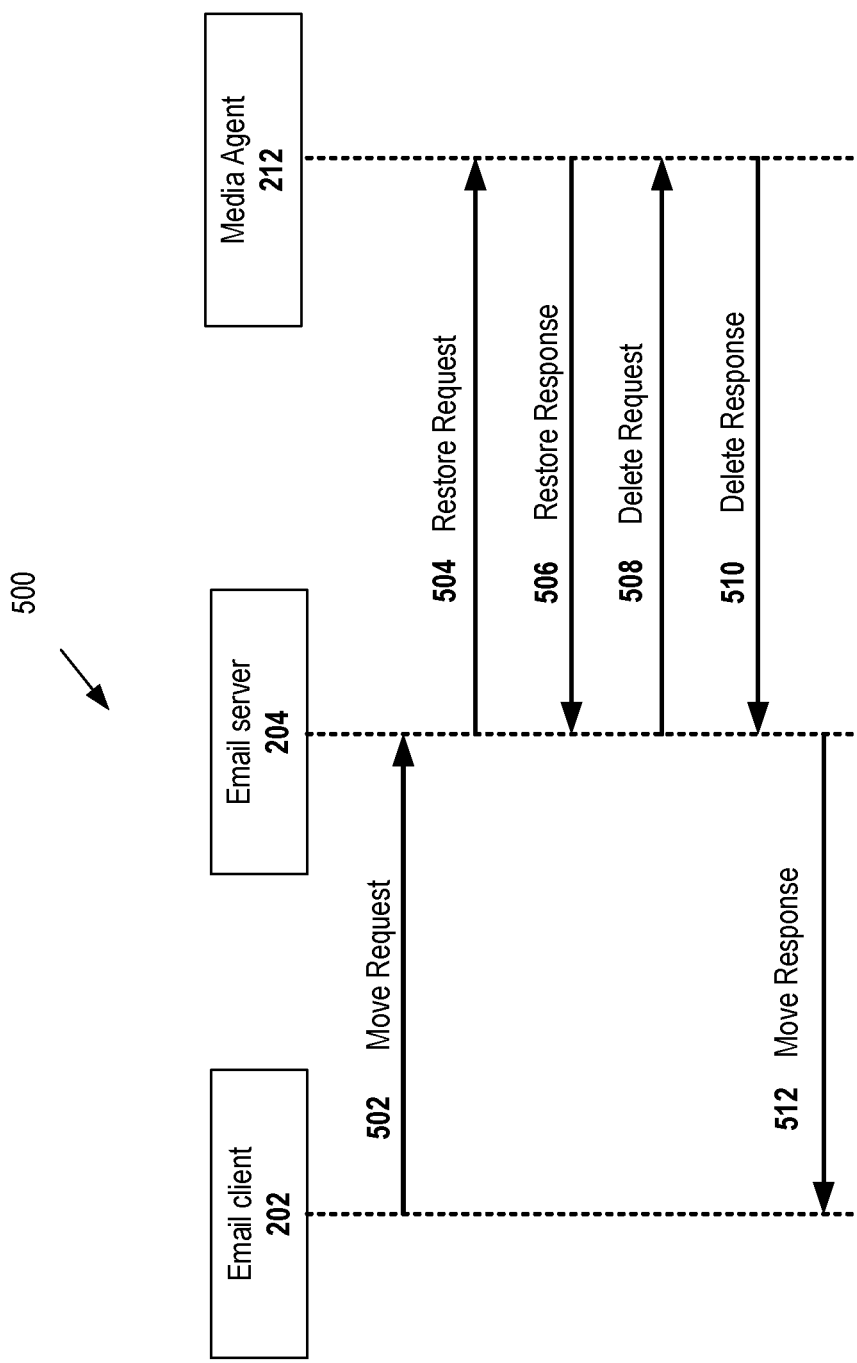
FIG. 5 depicts an example of messages exchanged when moving a mail item from an archive folder to a live folder.

FIG. 5 depicts an example signal exchange diagram 500 in which the email client 202 sends a request 502 to move an email item from an archive folder to a live folder. In response, the email server 204 may first restore the email item to be moved by sending a restore request 504 (similar to the above described request 404) to the media agent. The email server 204 may receive the archived email item in a restore response 506. The email server 204 may then store the received email item into the live folder to which the email item is to be moved. The email server 204 may then proceed to delete the email item from the archive folder (because when the item is moved out of the archive folder) by sending a delete request 508 to the media agent 212 and receiving a delete response 510, confirming that the media agent 212 has deleted the corresponding email item from its backup location. The email server 204 may then notify the email client 202, via a move response message 512, that the requested move was successfully completed. If an error condition is detected during the restore/delete operations, an error message may instead by sent in the move response 512.

Figure 6:
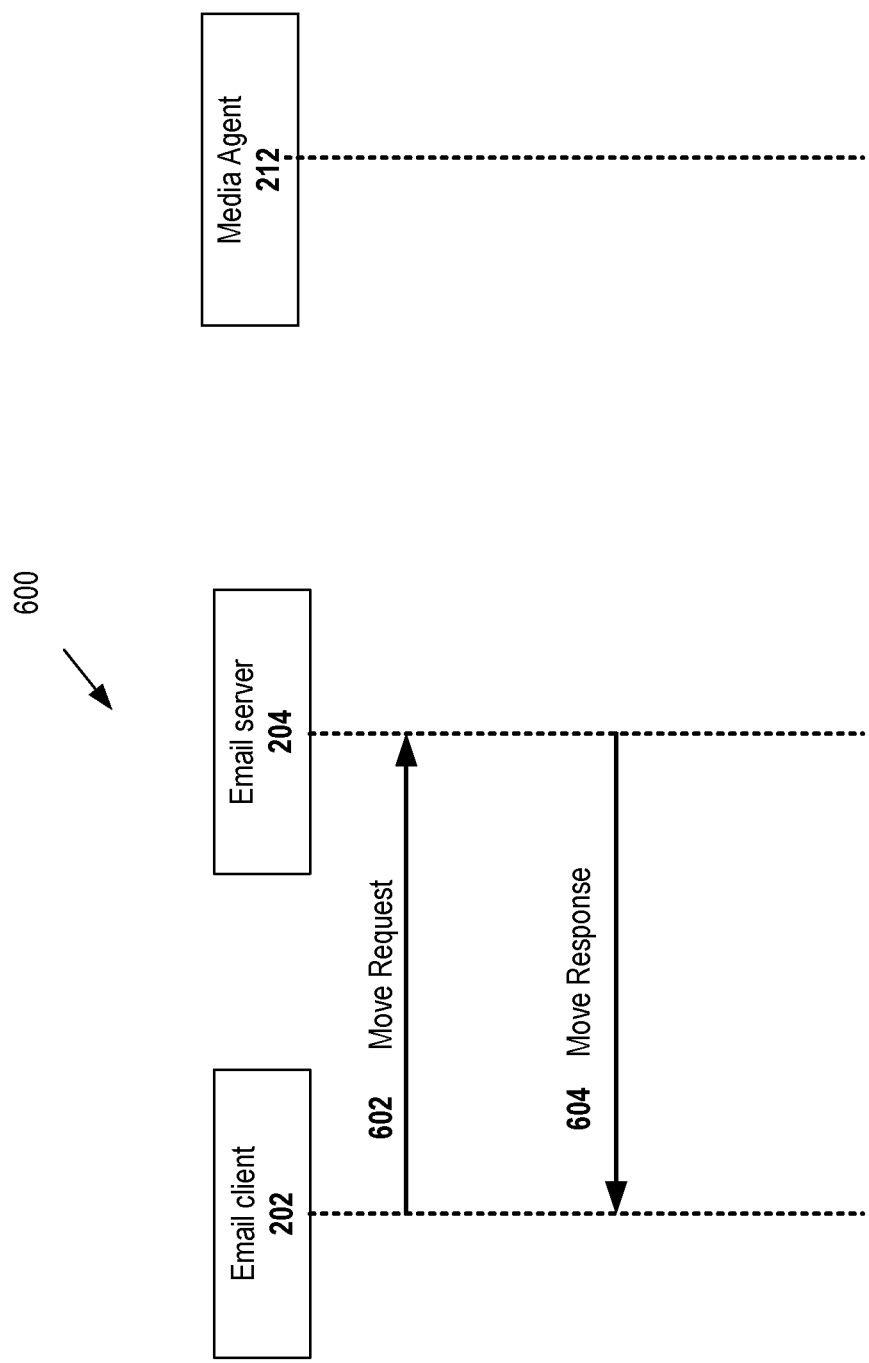
FIG. 6 depicts an example of messages exchanged when moving a mail item out of an archive folder is not allowed.

FIG. 6 depicts an example signal exchange diagram 600 in which the email client 202 sends a request 602 to move an email item from an archive folder to a live folder. In contrast to the signal exchanges depicted in FIG. 5, the email server 204 may be controlled by an operator policy to decline changes to archive folders by the user. For example, in some embodiments, email archive folders may only be generated based on an operator-specified policy (e.g., send all emails older than 1 year to the archive folder) but individual users may be precluded from creating their own archive policies. In such a case, the email server 204 may respond to the email client by a message 604 indicating that the requested move operation is disallowed by the system policy. Alternatively, in some embodiments, a "move" operation may be treated as a "copy" operation, and the requested email items may be restored from the archive folder into a live folder without deleting these items from the archive folder (e.g., without message 508 and the corresponding deletion).

Figure 7:
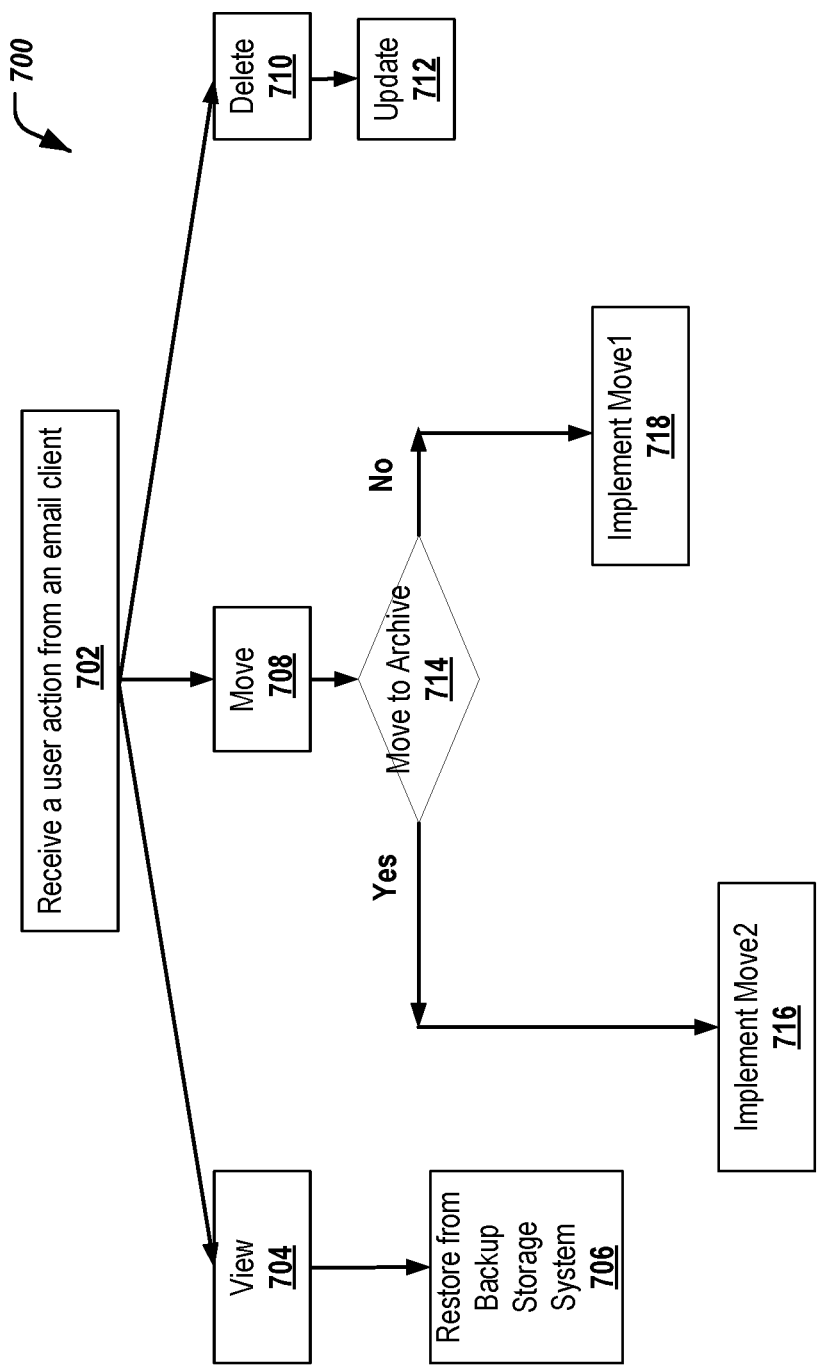
FIG. 7 depicts a flowchart of various user interactions with archived email items and corresponding actions by a mail server.

FIG. 7 is a flowchart depiction 700 of examples of various tasks performed by the email server 204 for providing a seamless user experience when the user is interacting with backed up emails. The email server 204 receives a user action at 702. The user action may be received via a message that complies with a known standard such as the IMAP standard. To provide a seamless user experience, the email server 204 may allow a user to use an industry standard email client application and may support email item actions that the user is accustomed to. For example, when a user wants to view (704) an email (sometimes called "opening" the email), the server 204 may cause the corresponding email item to be restored from a backup location (706). The email server 204 may act upon a "move email item" action (708) differently (decision 714) based on whether the email is being moved from an archive folder to a live folder ("Move1" 718) or from a live folder to an archive folder ("Move2" 716). A request to delete an email item from the archive folder (710) may be handled differently, based on an operational policy setting, as previously discussed. For example, using one operational policy, deletion from an archive email folder, or generally any changes to emails in the archive folder, by a user may be disabled. A user making such a request may be provided with an error message such as "this functionality is disabled" or "please contact your administrator" and so on.

In some embodiments, using another operational policy, an archived email item may be "deleted" from the ongoing user session by associating a flag with the entry for that email item, identified by a unique email item identifier, indicating that the user has deleted the email item. However, no corresponding alteration may be made to the archive folder. In other words, during the email session, the user may see that the email item is deleted, but when the user logs out and logs back into another email session, the previously "deleted" item may become available to the user again. Using another operational policy, a user may be allowed to modify his archive folder by deleting, moving, altering email items in the archive folder.

Figure 8:
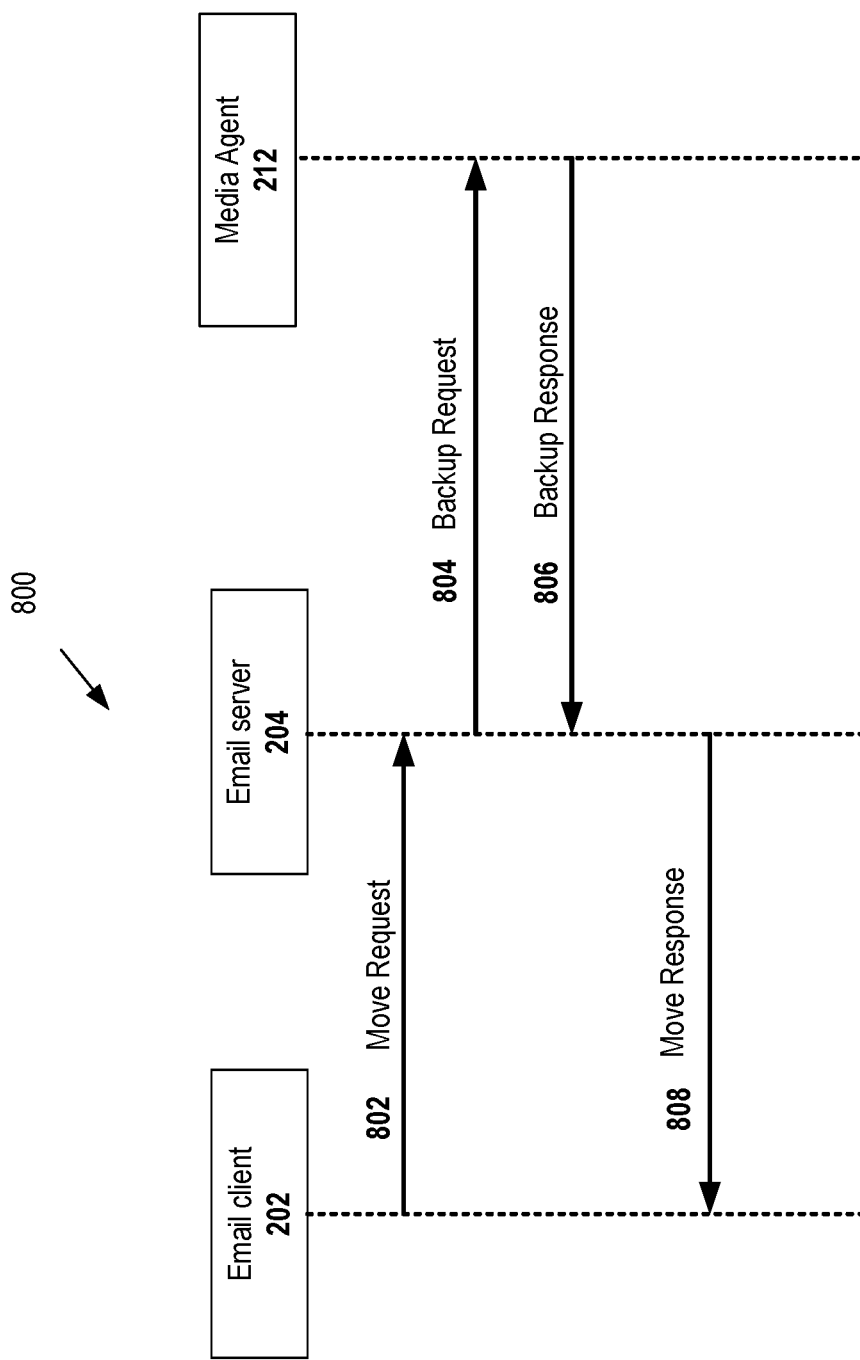
FIG. 8 depicts an example of messages exchanged when copying an email item into an archive folder.

The above-described "Move1" operation may be implemented using the message exchange 500 described with respect to FIG. 5. FIG. 8 shows an example signal exchange diagram 800 for implementing the "Move2" operation. The email server 204 may receive a move request 802, in which the email client 202 requests that a live mail item be moved into an archive folder. In response, the email server 204 requests a corresponding media agent 212 to perform a backup operation (backup request 804) for backing up the requested email item. Upon receiving a confirmation of the backup operation from the media agent 212 as a backup response 806 (or an error message), the email server 204 may then provide a response 808 to the email client 202 indicating the result of the move request 802. The email server 204 may also receive data regarding the backup location of this email item in the backup storage system and may update a local table to associate the identity of the email item with its backup location.

In one advantageous aspect, the techniques disclosed in the present document can be used to provide seamless access by users to their archived emails. From a user's perspective, there may not be any change to the mail interface. Archived emails can simply appear as a folder in the user's email account. Similarly, without changing the email client application code, or the protocol for communication between the email client and the email server, the additional functionality of email archiving can be brought into an email service.

Figure 9:
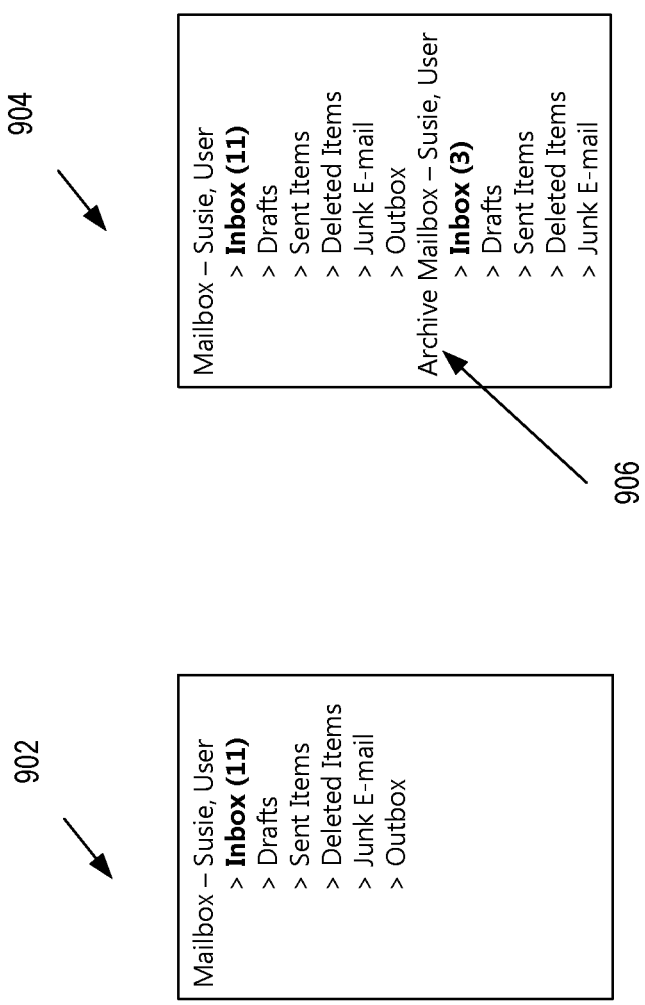
FIG. 9 is an example of a user interface on which an archive email folder is displayed.

FIG. 9 depicts screenshot examples of how archive mailbox folder can be displayed to a user. Email client applications often present a navigation bar view 902 of a user's account by listing folders such as Inbox, Drafts, Sent Items, Deleted Items, etc. As previously discussed, the email items stored in each of these folders are typically stored live. The live items are cached either at the client side and/or the server side, depending on email data caching policies of a particular email service. The screenshot 904 shows an example of how a user's archive folder can be displayed to the user. In this example, the archive mailbox appears in the navigation portion 906 as a second email account "archive mailbox", with additional folders listed in a list under this account. The display and user interactions allowed to be performed with the archive folder may be identical to the display and user actions allowed for the live mail items. Thus, the archived emails are seamlessly made available to a user without having to take additional steps such as navigating to a different mail server or be trained to use a different user interface and does not require the user to be aware that a given email item is live or archived.

Grouping all the archived email items under a logical "mailbox", e.g., as depicted in FIG. 9, also allow for the possibility of securing the email items using different user credentials (username/password). In some embodiments, different users of an email service may be offered different levels of access to their archived mail items (e.g., power users could see all archived email items, whereas other users may be able to see only last 5 years' archived items), based on username/password credentials.

In some embodiments, the email server may simply act as an intermediary in allowing communication between the email client 202 and the backup storage system 206, without caching at the email server 204. In one advantageous aspect, this relieves the email server 204 of having to provide resources (storage and computational) to store, temporarily or permanently, archived email messages.

In some embodiments, the email server 204 may maintain an index of email items in the archived folder. The index may include metadata associated with email items, such as To, From, Subject, Time Received/Sent, etc. The email server 204 may provide to the email client for use in displaying emails in the archive folder when the user views that folder. In some embodiments, the email server 204 may perform a pre-fetch function in which the email server 204 may restore from archive not just the email item that is requested by a user but also other information logically associated with that email item. This information may include, e.g., some emails before or after (in a sorted list) the requested email. For example, if the requested email is from an archived folder that is currently sorted based on received time, then the pre-fetched information may include two emails received immediately before, and two emails received immediately after, the requested email item. In one aspect, the pre-fetching may facilitate user experience in which a user can step through email items one at a time without having to experience the delay of fetching every next item from the archived folder while the user is browsing through items in the forward or reverse direction. In some embodiments, the pre-fetching may be managed by the email server 204 and/or a media agent 144 that controls to store/restore operation of an archive folder on a particular media.

Figure 10:
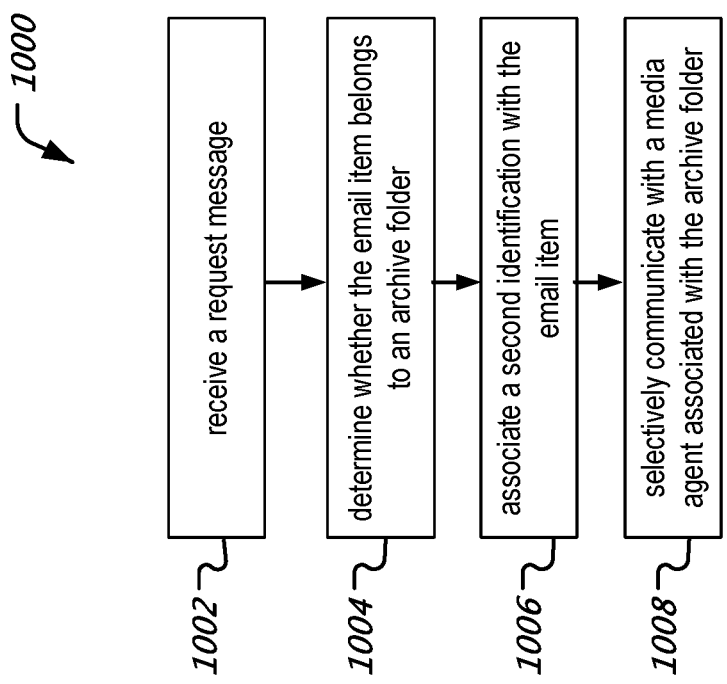
FIG. 10 is a flowchart representation of an example process of facilitating access to archived emails.

FIG. 10 is a flowchart representation of an example method 1000 for facilitating user access to electronic mail stored in a backup format.

At 1002, the method 1000 receives a request message comprising a first identification of an email item and an action associated with the email item, the request message being based on a first protocol format. The first protocol format may be based on a well-known format such as IMAP (or a variant thereof), Post Office Protocol (POP), Simple Mail Access Protocol (SMAP), Webmail protocol, Secure Mail Transfer Protocol (SMTP), etc. In some embodiments, the action associated with the email item may include one or more logical steps. For example, opening a particular mail item in the inbox folder logically includes a first step of accessing the inbox followed by a second step of accessing the requested email item.

At 1004, the method 1000 determines whether or not the email item belongs to an archive folder, wherein the archive folder stores data in the backup format. As previously discussed, a variety of techniques may be used for this determination. In some embodiments, an email item's identification number may numerically fall within an archive range, indicating that the email item is an archived email item. In some embodiments, the email item's identification may point to a user resource locator corresponding to a backup storage system. For example, all email items from the archive folder may include an identification string "archive.mailserver" prefix. In some embodiments, the folder from which the email is accessed may indicate whether the email is a live or an archived item. The backup format differs from the native format used for storing email items stored in a non-archived format.

At 1006, the method 1000 associates, upon determination that the email item belongs to the archive folder, a second identification with the email item. In some embodiments, the second identification comprises an identification string that identifies a location of the email on a backup media. For example, the second identification may specify that the email item is available on/dev/tape2, at 0x389573 byte offset. The second identification includes indicative of a backup media and a location on the backup media where the email is accessible from.

At 1008, the method 1000 selectively communicates with a media agent associated with the archive folder to perform the action associated with the email item. As previously discloses with respect to FIG. 3, FIG. 4, FIG. 5, FIG. 7 and FIG. 8, the method 1000 may request restoration, backup or deletion of the email item from an archived folder.

In some embodiments, the action may include a request to view, or open, an email. In some embodiments, the method 1000 may store a mapping between the first identification on the interface with the email client and the second identification on the interface with a backup storage system in the form of an association table. To fulfil the mail viewing request, the method 1000 may request restoration of an archived copy of the email item, which is stored in a backup format on a backup device such as a tape or a backup hard drive, etc.

In some embodiments, the action may request deletion of a mail item from the archive folder. Depending on an operational policy, the method 1000 may either reject the request for deletion or perform deletion locally at an email server without deleting the corresponding mail item stored on a backup device, or may request the deletion of the backup copy at the backup storage system.

In some embodiments, the determination of whether the email item belongs to the archive folder includes applying a bitmask to the first identification number. For example, as previously described, a most significant bit value of "1" for the first identification number may indicate that the email item is in the archived format.

In some embodiments, the method 1000 may pre-fetch a number of email items related to the requested email. For example, the pre-fetched items may be in a logical sequence before or after the requested email item, such as one or two email items before and after the requested email item to facilitate rapid browsing through emails.

In some embodiments, the email server 204 may allow a user to access her mailbox using different off-the-shelf client applications that use disparate protocols for communication with the email server 204. Thus, a user may be able to access archived email items from different hardware/software platforms. At different times, the email server 204 may receive request messages from the user's device for performing different actions and the request messages may be communicated using different protocol formats (e.g., IMAP or POP). For example, at one time, the user may log into his email account on the email server using a Windows platform based personal computer. At another time, the user may log into his email account using an Android based mobile device (e.g., a smartphone) which may use a different protocol format to establish a connection to the user's email account. In both cases, the user's client device and email application may be unaware of the details of which email items are archived and which are in a live format because the email server may hide the details of store/restore operations for archived emails.

Figure 11:
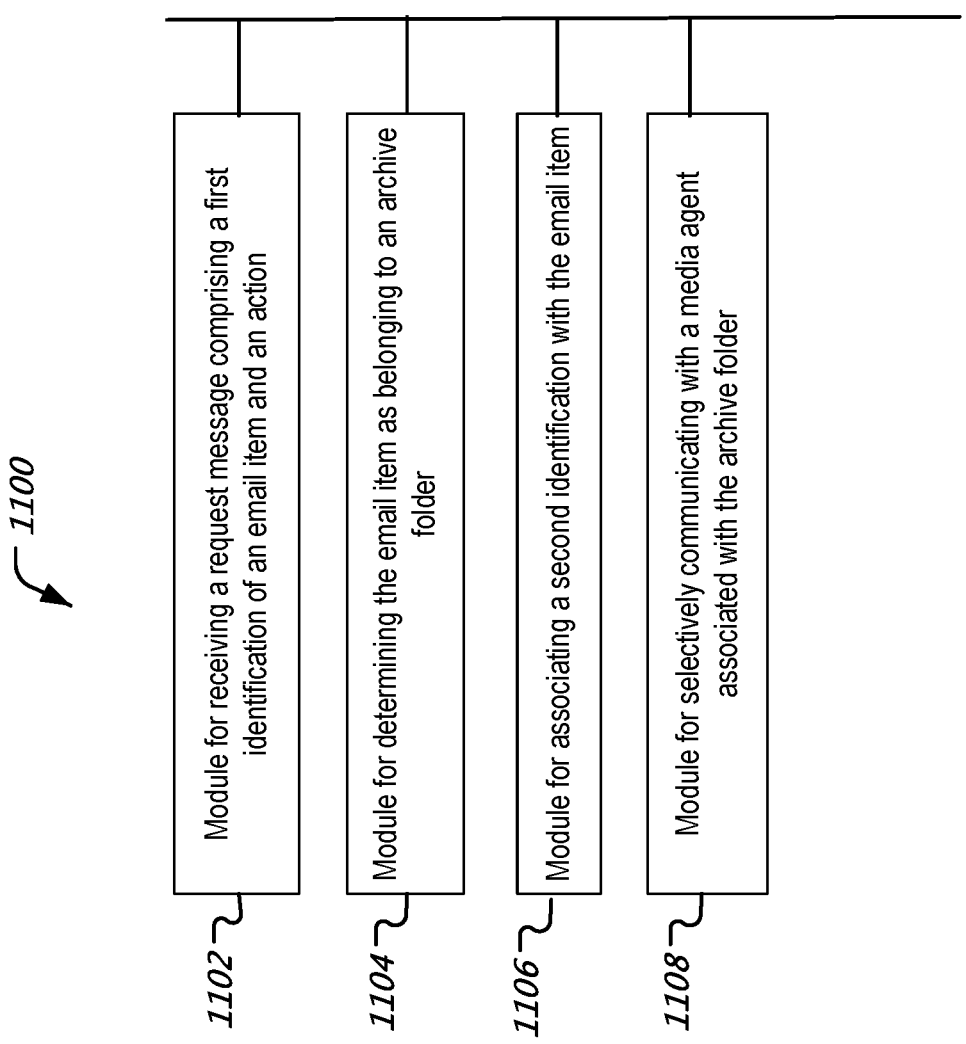
FIG. 11 is a block diagram representation of an apparatus for facilitating access to archived emails.

FIG. 11 is a block diagram representation of an apparatus 1100 for facilitating a user's access to archived email messages. In some embodiments, the apparatus 1100 may be located at the email server 204. The module 1102 (e.g., a mail protocol processing module) is for receiving a request message comprising a first identification of an email item and an action associated with the email item. The request message may be based on a first protocol format such as IMAP, POP, SMTP, and so on. The module 1104 (e.g., a mail archive management module) is for determining whether or not the email item is in the backup format. The module 1104 may implement various techniques disclosed in the present document for making the determination.

The module 1106 (e.g., an association module) is for associating a second identification with the email item. The module 1108 (e.g., a storage communication module) is for selectively communicating with a media agent associated with the archive folder to perform the action associated with the email item. The module 1108 may communicate selectively at least because the module 1108 may respond to certain requests (e.g., previously discussed move request 602), without having to communicate with the media agent 212.

In some embodiments, an email system includes one or more email client devices and an email server. The email client device receives user interactions with an email item and communicates the user interaction to an email server. The email server receives the communication, determines a type of the email message, upon determination that the type is a live mail, performs a first action on a live email database and upon determination that the type is an archived email, performs a message exchange with a backup storage system. The backup storage system stores the email message in a backup format.

In some embodiments, a computer implemented method of providing access to electronic mail stored in a backup format includes displaying a listing of electronic mail on a user interface, the listing including an entry for an email item stored in the backup format, receiving an input for performing an action with the email item, communicating, to an email server, a request message comprising a first identification of the email item and a second identification of an action associated with the email item, receiving, from the email server, a response message including a result of performing the action, and displaying the result on the user interface. The email server may perform the requested action on the email item using, e.g., method 1000 described above.

It will be appreciated that various techniques have been disclosed for allowing seamless access to archived email messages. Using some of the techniques disclosed in the present document, without a need to learn a new email interface and without a need to install a new email application of his client device such as a mobile phone, a user can access and interact with archive emails.

It will further be appreciated that an email server can provide seamless connectivity between a standard email client, e.g., a web-based mail interface, and a backup storage system. The email server communicates with the email client via a first protocol, e.g., an industry-standard email protocol such as IMAP. The email server communicates with the backup storage system based on a second protocol, e.g., application programmer interface (APIs) specific to the backup storage system. In some disclosed embodiments, without local caching of email messages, the email server provides a seamless user experience to normal email interactions such as view, copy, delete email items, by allowing the user to directly interact with archived data.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method comprising:
    at an email server that is communicatively coupled to a backup storage system, wherein the email server comprises a computer platform, which includes one or more hardware processors:
    receiving a first request message comprising a first identification of a first email item and further comprising a first action to be applied to the first email item;
    determining, based on the first identification, whether the first email item is archived at the backup storage system,
        wherein the backup storage system stores email items in a backup format generated by the backup storage system, and
        wherein the backup format differs from a native format of email items that are not archived at the backup storage system;
    associating a first information with the first email item, based on determining that the first email item is archived at the backup storage system,
        wherein the first information indicates a backup media and a location on the backup media of the first email item;
    causing the backup storage system to apply the first action to the first email item within the backup storage system, based on the first information;
    in response to the first request message, presenting, within a user interface of the email server, a result of the first action as applied by the backup storage system to the first email item; and
    wherein the backup storage system is configured to apply the first action within the backup storage system without deleting the first email item from the backup storage system.

2. The computer-implemented method of claim 1, wherein the first request message is based on a first protocol format, and further comprising:
    at the email server:
    receiving a second request message comprising a second identification of the first email item and a second action to be applied to the first email item,
        wherein the second request message is based on a second protocol format that is different from the first protocol format;
    causing the backup storage system to apply the second action to the first email item within the backup storage system;
    in response to the second request message, presenting, within a user interface of the email server, a result of the second action as applied to the first email item; and
    wherein the backup storage system is configured to apply the second action within the backup storage system without deleting the first email item, in the backup format, from the backup storage system.

3. The computer-implemented method of claim 1, wherein the first request message comprises viewing the first email item, and wherein the email server causes the backup storage system to restore the first email item from the backup format to the native format, wherein the first email item as restored by the backup storage system is viewable in the user interface.

4. The computer-implemented method of claim 1, wherein the first request message comprises viewing the first email item, and wherein the causing the backup storage system to apply the first action to the first email item comprises instructing the backup storage system to restore the first email item from the backup format to the native format.

5. The computer-implemented method of claim 1, wherein
    the user interface of the email server is configured not to indicate one or more of: that the email server is communicatively coupled to the backup storage system, that the first email item is archived at the backup storage system, and that the backup storage system applied the first action to the first email item.

6. The computer-implemented method of claim 1, wherein the first request message comprises deleting the first email item, and wherein the computer-implemented method further comprises:
    in response to the first request message, presenting, within the user interface of the email server, an indication that the first action is disallowed by a system policy.

7. The computer-implemented method of claim 1, wherein the first request message comprises one or more of: moving the first email item and deleting the first email item, and wherein a response to the first request message presented in the user interface indicates that the first action is disallowed by a system policy.

8. The computer-implemented method of claim 1, wherein the first request message comprises moving the first email item from the backup storage system to a storage location that is associated with the email server and is outside the backup storage system, and wherein the email server causes the backup storage system to restore the first email item from the backup format to the native format, and wherein the first email item is stored, in the native format, into the storage location that is associated with the email server.

9. The computer-implemented method of claim 1, wherein the backup format stores the first email item in a format that is one or more of: encrypted and de-duplicated.

10. The computer-implemented method of claim 1 further comprising: maintaining by the email server an index of email items that are in the backup storage system, including the first email item, and wherein the determining that the first email item is archived is based on the index.

11. A system comprising:
    an email server that comprises a computer platform, which includes one or more hardware processors; and
    a backup storage system that comprises a first computing device, which includes one or more hardware processors and which is distinct from the email server, wherein the backup storage system is in communication with the email server;
    wherein the email server is configured to:
    receive a first request message comprising a first identification of a first email item and further comprising a first action to be applied to the first email item;
    determine, based on the first identification, whether the first email item is archived at the backup storage system,
        wherein the backup storage system stores email items in a backup format generated by the backup storage system, and
        wherein the backup format differs from a native format of email items that are not archived at the backup storage system;

associate first information with the first email item, based on determining that the first email item is archived at the backup storage system,
wherein the first information indicates a backup media and a location on the backup media of the first email item;
cause the first computing device at the backup storage system to apply the first action to the first email item within the backup storage system, based on the first information;
in response to the first request message, presenting, within a user interface of the email server, a result of the first action as applied by the backup storage system to the first email item; and
wherein the backup storage system is configured to apply the first action within the backup storage system without deleting the first email item from the backup storage system.

12. The system of claim 11, wherein the first request message is based on a first protocol format, and wherein the email server is further configured to:
receive a second request message comprising a second identification of the first email item and a second action to be applied to the first email item,
wherein the second request message is based on a second protocol format that is different from the first protocol format;
cause the first computing device at the backup storage system to apply the second action to the first email item within the backup storage system;
in response to the second request message, present, within the user interface of the email server, a result of the second action as applied to the first email item; and
wherein the backup storage system is configured to apply the second action within the backup storage system without deleting the first email item from the backup storage system.

13. The system of claim 11, wherein the first request message comprises viewing the first email item, and wherein the email server is further configured to cause the first computing device to restore the first email item from the backup format to the native format, wherein the first email item as restored by the first computing device is viewable in the user interface.

14. The system of claim 11, wherein the first request message comprises viewing the first email item, and wherein the email server is further configured to instruct the first computing device to restore the first email item from the backup format to the native format.

15. The system of claim 11, wherein
the user interface of the email server is configured not to indicate one or more of: that the first email item is archived at the backup storage system, and that the backup storage system applied the first action to the first email item.

16. The system of claim 11, wherein the first request message comprises deleting the first email item, and wherein the email server is further configured to:
in response to the first request message, present, within the user interface of the email server, an indication that the first action is disallowed by a system policy.

17. The system of claim 11, wherein the first request message comprises one or more of: moving the first email item and deleting the first email item, and wherein a response to the first request message presented in the user interface indicates that the first action is disallowed by a system policy.

18. The system of claim 11, wherein the first request message comprises moving the first email item from the backup storage system to a storage location that is associated with the email server and is outside the backup storage system, and wherein the email server is further configured to cause the first computing device to restore the first email item from the backup format to the native format, and wherein first computing device is configured to store the first email item, in the native format, into the storage location that is associated with the email server.

19. The system of claim 11, wherein the backup format stores the first email item in a format that is one or more of: encrypted and de-duplicated.

20. The system of claim 11 wherein the email server is further configured to:
maintain an index of email items that are in the backup storage system, including the first email item; and
determine, based on the index, whether the first email item is archived in the backup storage system.

* * * * *